United States Patent
Siminoff et al.

(10) Patent No.: US 10,846,810 B2
(45) Date of Patent: Nov. 24, 2020

(54) LEVERAGING AUDIO/VIDEO RECORDING AND COMMUNICATION DEVICES TO ENHANCE PUBLIC SAFETY

(71) Applicant: Amazon Technologies, Inc., Seattle, WA (US)

(72) Inventors: James Siminoff, Pacific Palisades, CA (US); August Cziment, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 15/675,726

(22) Filed: Aug. 12, 2017

(65) Prior Publication Data
US 2018/0053225 A1    Feb. 22, 2018

Related U.S. Application Data

(60) Provisional application No. 62/376,842, filed on Aug. 18, 2016.

(51) Int. Cl.
*G06Q 50/26* (2012.01)
*G08B 3/10* (2006.01)
(Continued)

(52) U.S. Cl.
CPC ............ *G06Q 50/265* (2013.01); *G08B 3/10* (2013.01); *G08B 13/19619* (2013.01); *G08B 13/19658* (2013.01); *H04N 5/91* (2013.01); *H04N 7/186* (2013.01); *G06Q 30/0277* (2013.01); *G08B 13/19656* (2013.01)

(58) Field of Classification Search
None
See application file for complete search history.

(56) References Cited

U.S. PATENT DOCUMENTS

| 4,764,953 A | 8/1988 | Chern et al. |
| 5,428,388 A | 6/1995 | von Bauer et al. |
| (Continued) | | |

FOREIGN PATENT DOCUMENTS

| CN | 2585521 Y | 11/2003 |
| CN | 2792061 Y | 6/2006 |
| (Continued) | | |

OTHER PUBLICATIONS

Lee, Myung Jin, International Search Report and Written Opinion of the International Searching Authority for PCT/US/2017/046658, dated Nov. 9, 2017, International Application Division, Korean Intellectual Property Office, Republic of Korea.

*Primary Examiner* — Alexandru Cirnu
(74) *Attorney, Agent, or Firm* — Greenberg Traurig, LLP

(57) ABSTRACT

Some aspects of the present embodiments enable users of audio/video (A/V) recording and communication devices to report video footage to one or more reward providers. The reward provider may then review the reported video footage, determine whether a crime may have been committed, determine an amount of a reward to be offered, and post a reward offer through one or more outlets. The present embodiments may help in reducing crimes by publicizing criminal events and incentivizing members of the public to come forward with information that can be used to help identify and apprehend criminal perpetrators and/or to solve crimes.

20 Claims, 18 Drawing Sheets

(51) Int. Cl.
  *G08B 13/196* (2006.01)
  *H04N 5/91* (2006.01)
  *H04N 7/18* (2006.01)
  *G06Q 30/02* (2012.01)

(56) References Cited

U.S. PATENT DOCUMENTS

| | | | |
|---|---|---|---|
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,872,915 B1 | 5/2014 | Scalisi et al. | |
| 8,780,201 B1 | 7/2014 | Scalisi et al. | |
| 8,823,795 B1 | 9/2014 | Scalisi et al. | |
| 8,842,180 B1 | 9/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,055,202 B1 | 6/2015 | Scalisi et al. | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,109,378 B2 | 8/2015 | Scalisi | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Scalisi et al. | |
| 9,165,444 B2 | 10/2015 | Scalisi | |
| 9,172,920 B1 | 10/2015 | Scalisi et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Scalisi | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng | |
| 2006/0156361 A1 | 7/2006 | Wang et al. | |
| 2007/0008081 A1 | 1/2007 | Tylicki et al. | |
| 2007/0182543 A1 | 8/2007 | Luo | |
| 2009/0248643 A1 | 10/2009 | Wasson | |
| 2009/0319361 A1* | 12/2009 | Conrady | G06Q 10/10 705/14.26 |
| 2010/0225455 A1 | 9/2010 | Claiborne et al. | |
| 2013/0057695 A1 | 3/2013 | Huisking | |
| 2014/0267716 A1 | 9/2014 | Child et al. | |
| 2015/0163463 A1 | 6/2015 | Hwang et al. | |

FOREIGN PATENT DOCUMENTS

| | | | |
|---|---|---|---|
| EP | 0944883 A1 | 6/1998 | |
| EP | 1480462 A1 | 11/2004 | |
| GB | 2286283 A | 8/1995 | |
| GB | 2354394 A | 3/2001 | |
| GB | 2357387 A | 6/2001 | |
| GB | 2400958 A | 10/2004 | |
| JP | 2001-103463 A | 4/2001 | |
| JP | 2002-033839 A | 1/2002 | |
| JP | 2002-125059 A | 4/2002 | |
| JP | 2002-342863 A | 11/2002 | |
| JP | 2002-344640 A | 11/2002 | |
| JP | 2002-354137 A | 12/2002 | |
| JP | 2002-368890 A | 12/2002 | |
| JP | 2003-283696 A | 10/2003 | |
| JP | 2004-128835 A | 4/2004 | |
| JP | 2005-341040 A | 12/2005 | |
| JP | 2006-147650 A | 6/2006 | |
| JP | 2006-262342 A | 9/2006 | |
| JP | 2009-008925 A | 1/2009 | |
| KR | 10-2006-0113230 A | 11/2006 | |
| WO | 1998/39894 A1 | 9/1998 | |
| WO | 2001/13638 A1 | 2/2001 | |
| WO | 2001/93220 A1 | 12/2001 | |
| WO | 2002/085019 A1 | 10/2002 | |
| WO | 2003/028375 A1 | 4/2003 | |
| WO | 2003/096696 A1 | 11/2003 | |
| WO | 2006/038760 A1 | 4/2006 | |
| WO | 2006/067782 A1 | 6/2006 | |
| WO | 2007/125143 A1 | 8/2007 | |
| WO | 2016-109839 A1 | 7/2016 | |
| WO | WO-2016109839 A1 * | 7/2016 | G07C 9/00 |

* cited by examiner

LEVERAGING AUDIO/VIDEO RECORDING AND COMMUNICATION DEVICES TO ENHANCE PUBLIC SAFETY

CROSS-REFERENCE TO RELATED APPLICATION

This application claims priority to provisional application Ser. No. 62/376,842, filed on Aug. 18, 2016, the entire contents of which are hereby incorporated by reference.

TECHNICAL FIELD

The present embodiments relate to audio/video (A/V) recording and communication devices, including A/V recording and communication doorbells and A/V recording and communication security cameras. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells and security cameras, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The present embodiments for leveraging audio/video (A/V) recording and communication devices to reduce crime and enhance public safety have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that video footage captured by A/V recording and communication devices can be leveraged to reduce crime and enhance public safety. A/V recording and communication devices, including A/V recording and communication doorbells, routinely capture video footage of crimes being committed. A/V recording and communication doorbells are typically located at the front entrances to homes and businesses, and are thus well positioned to capture video footage of crimes that occur in and around homes and businesses, such as burglary and vandalism. Many of these devices have a field of view that covers the area in front of the home or business, including the street, and are thus well positioned to capture video footage of crimes that occur on the street, such as auto theft.

Oftentimes, however, the owner (or occupant) of the home or business where a crime occurred is not able to identify the person(s) in the video footage recorded by the A/V recording and communication device. When law enforcement is also unable to identify the perpetrator(s), information from the public can be helpful in solving the crime. One way to incentivize members of the public to come forward with information about unsolved crimes is to offer a reward. The present embodiments leverage the capabilities of A/V recording and communication devices to offer rewards to the public in exchange for information that helps to identify the person(s) in the video footage recorded by the A/V recording and communication device. The information provided by the public can help law enforcement to identify criminal perpetrators and get them off the street, thereby making communities safer.

In a first aspect, a method is provided, the method comprising receiving, from an audio/video (A/V) recording and communication device, a first alert signal and a first video signal, the first video signal including images captured by a camera of the A/V recording and communication device, transmitting, to a client device, in response to receiving the first alert signal and the first video signal, a second alert signal and a second video signal, the second video signal including the images captured by the camera of the A/V recording and communication device, receiving a report signal from the client device, in response to receiving the report signal from the client device, reviewing the images captured by the camera of the A/V recording and communication device, determining whether the images captured by the camera of the A/V recording and communication device indicate that a crime may have been committed, and when it is determined, based on the images captured by the camera of the A/V recording and communication device, that a crime may have been committed, posting an offer of a reward for information about the crime.

In an embodiment of the first aspect, posting the offer of the reward comprises transmitting information about the reward to at least one media outlet.

In another embodiment of the first aspect, posting the offer of the reward comprises buying one or more advertisements.

In another embodiment of the first aspect, the advertisements are online advertisements.

Another embodiment of the first aspect further comprises, in response to receiving the report signal from the client device, transmitting the images captured by the camera of the A/V recording and communication device to a law enforcement agency.

Another embodiment of the first aspect further comprises receiving information identifying a source of the received images captured by the camera of the A/V recording and communication device.

Another embodiment of the first aspect further comprises, in response to receiving the report signal from the client device and the information identifying the source of the received images captured by the camera of the A/V recording and communication device, accessing at least one data structure to determine, based on the information identifying the source, at least one social media service to receive the images captured by the camera of the A/V recording and communication device.

Another embodiment of the first aspect further comprises sending the images captured by the camera of the A/V recording and communication device to the at least one determined social media service.

In another embodiment of the first aspect, the A/V recording and communication device is a first A/V recording and communication device, and further comprising determining a number of other A/V recording and communication devices are within a defined distance of the first A/V recording and communication device.

In another embodiment of the first aspect, an amount of the reward is based on the determined number of other A/V recording and communication devices that are within the defined distance of the first A/V recording and communication device.

In another embodiment of the first aspect, the amount of the reward is directly correlated with the determined number of other A/V recording and communication devices that are within the defined distance of the first A/V recording and communication device.

In another embodiment of the first aspect, the information about the crime comprises information about a person who may have committed the crime.

Another embodiment of the first aspect further comprises receiving the information about the crime.

Another embodiment of the first aspect further comprises paying the reward.

In another embodiment of the first aspect, receiving the information about the crime comprises receiving the information via a web portal.

In another embodiment of the first aspect, the A/V recording and communication device is an A/V recording and communication doorbell.

In another embodiment of the first aspect, the client device is a smartphone.

In a second aspect, a method is provided, the method comprising receiving, from an audio/video (A/V) recording and communication device, a first alert signal and a first video signal, the first video signal including images captured by a camera of the A/V recording and communication device, transmitting, to a first client device, in response to receiving the first alert signal and the first video signal, a second alert signal and a second video signal, the second video signal including the images captured by the camera of the A/V recording and communication device, receiving a report signal from the first client device, in response to receiving the report signal from the first client device, transmitting, to a second client device, a third video signal, the third video signal including the images captured by the camera of the A/V recording and communication device, and when it is determined, based on the images captured by the camera of the A/V recording and communication device, that a crime may have been committed, posting an offer of a reward for information about the crime.

In an embodiment of the second aspect, posting the offer of the reward comprises transmitting information about the reward to at least one media outlet.

In another embodiment of the second aspect, posting the offer of the reward comprises buying one or more advertisements.

In another embodiment of the second aspect, the advertisements are online advertisements.

Another embodiment of the second aspect further comprises, in response to receiving the report signal from the first client device, transmitting the images captured by the camera of the A/V recording and communication device to a law enforcement agency.

Another embodiment of the second aspect further comprises receiving information identifying a source of the received images captured by the camera of the A/V recording and communication device.

Another embodiment of the second aspect further comprises, in response to receiving the report signal from the first client device and the information identifying the source of the received images captured by the camera of the A/V recording and communication device, accessing at least one data structure to determine, based on the information identifying the source, at least one social media service to receive the images captured by the camera of the A/V recording and communication device.

Another embodiment of the second aspect further comprises sending the images captured by the camera of the A/V recording and communication device to the at least one determined social media service.

In another embodiment of the second aspect, the A/V recording and communication device is a first A/V recording and communication device, and further comprising determining a number of other A/V recording and communication devices are within a defined distance of the first A/V recording and communication device.

In another embodiment of the second aspect, an amount of the reward is based on the determined number of other A/V recording and communication devices that are within the defined distance of the first A/V recording and communication device.

In another embodiment of the second aspect, the amount of the reward is directly correlated with the determined number of other A/V recording and communication devices that are within the defined distance of the first A/V recording and communication device.

In another embodiment of the second aspect, the information about the crime comprises information about a person who may have committed the crime.

Another embodiment of the second aspect further comprises receiving the information about the crime.

Another embodiment of the second aspect further comprises paying the reward.

In another embodiment of the second aspect, receiving the information about the crime comprises receiving the information via a web portal.

In another embodiment of the second aspect, the A/V recording and communication device is an A/V recording and communication doorbell.

In another embodiment of the second aspect, the first client device is a smartphone.

BRIEF DESCRIPTION OF THE DRAWINGS

The present embodiments for leveraging audio/video (A/V) recording and communication devices to reduce crime and enhance public safety now will be discussed in detail with an emphasis on highlighting the advantageous features. These embodiments depict the novel and non-obvious device(s), system(s), and/or method(s) shown in the accompanying drawings, which are for illustrative purposes only. These drawings include the following figures, in which like numerals indicate like parts.

DETAILED DESCRIPTION

Figure 1:
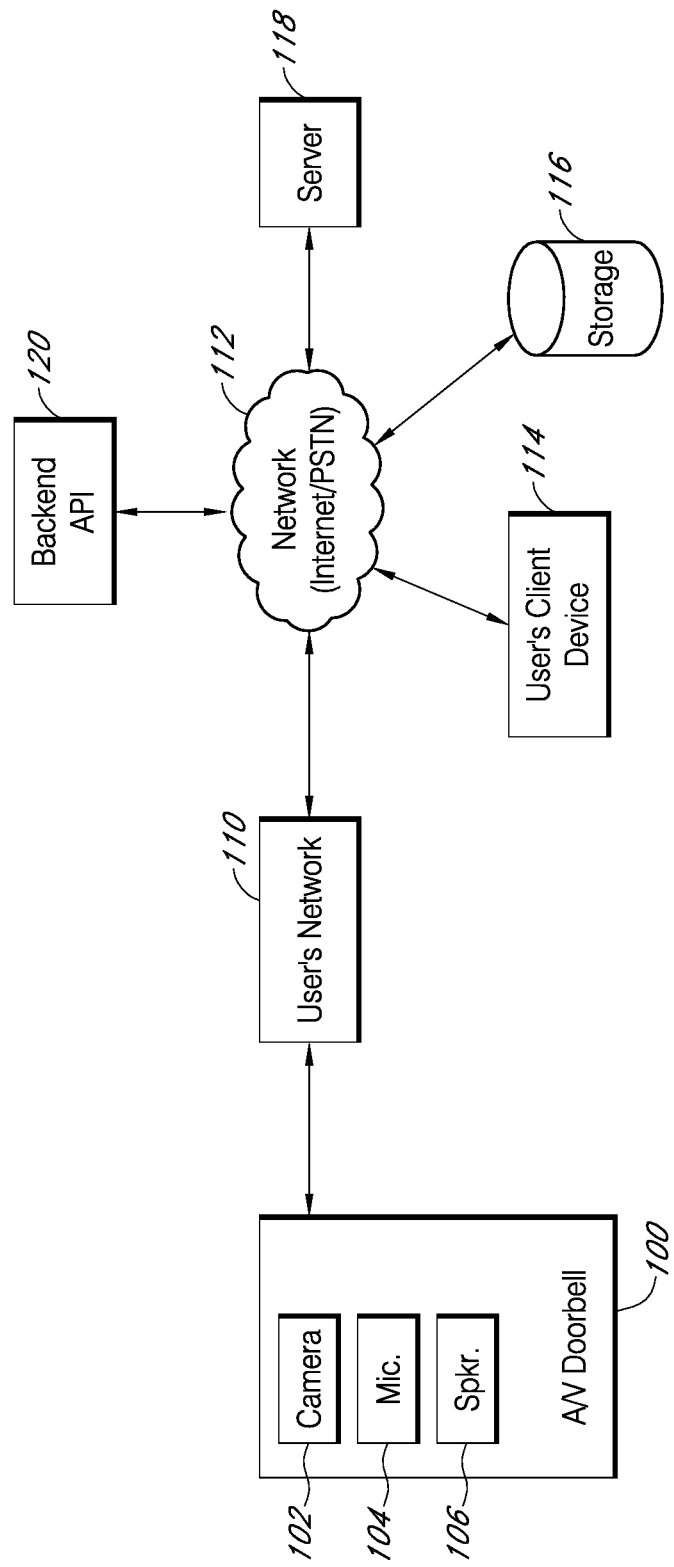
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The present embodiments for leveraging audio/video (A/V) recording and communication devices to reduce crime and enhance public safety are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 1080p or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in U.S. Pat. No. 9,584,775 (application Ser. No. 14/499,828) and U.S. Patent Publication No. 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence using a motion sensor, and/or by detecting that the visitor has depressed the button on the A/V recording and communication device 100.

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
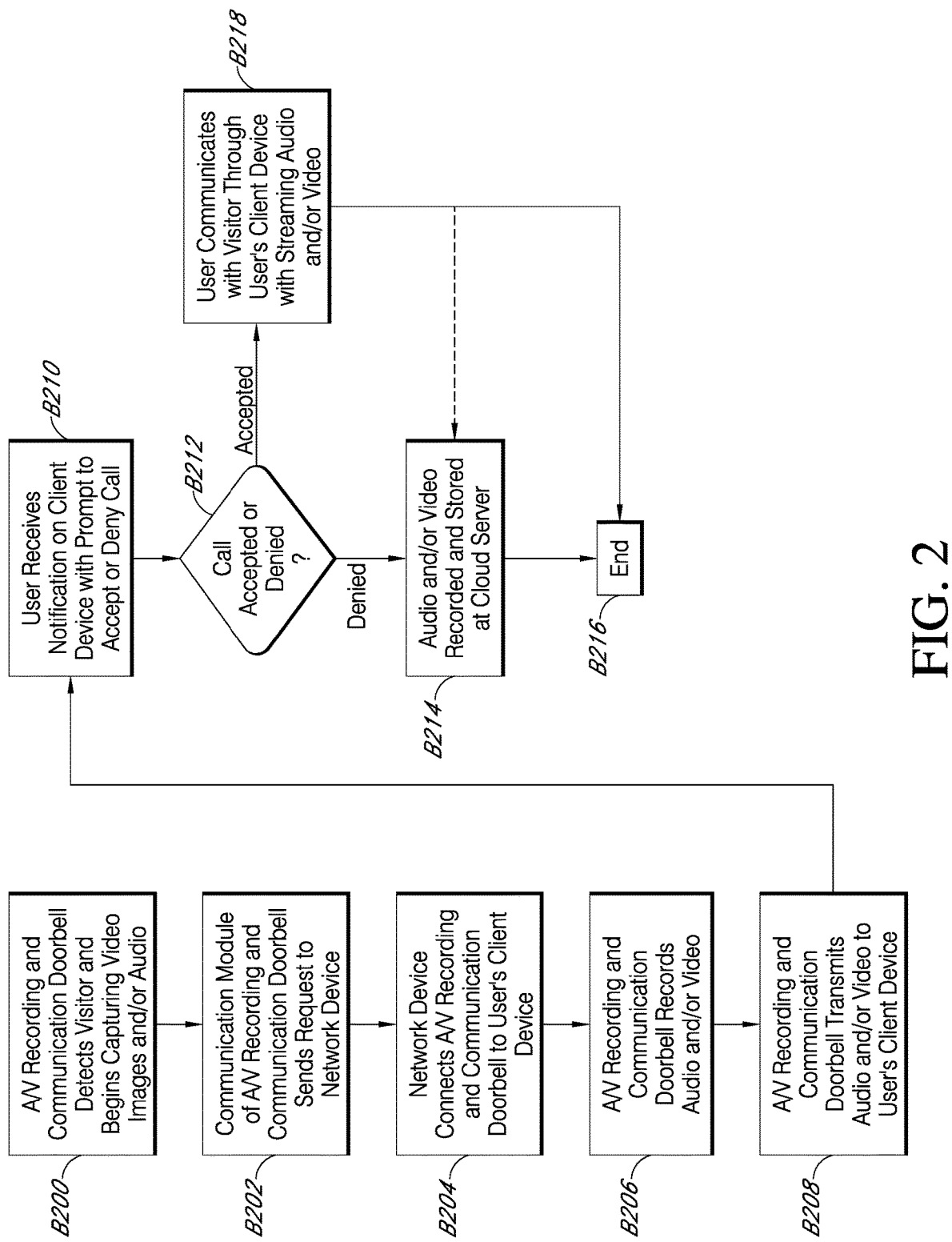
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
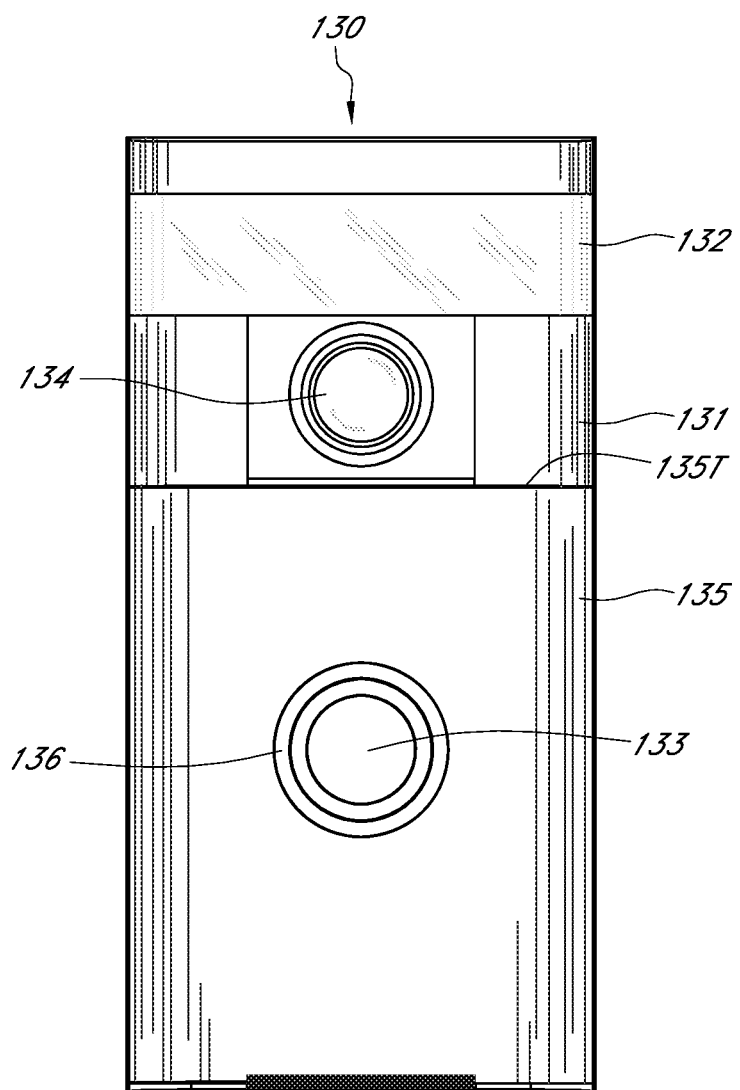
FIG. 3 is a front view of an A/V recording and communication device according to various aspects of the present disclosure.
Figure 4:
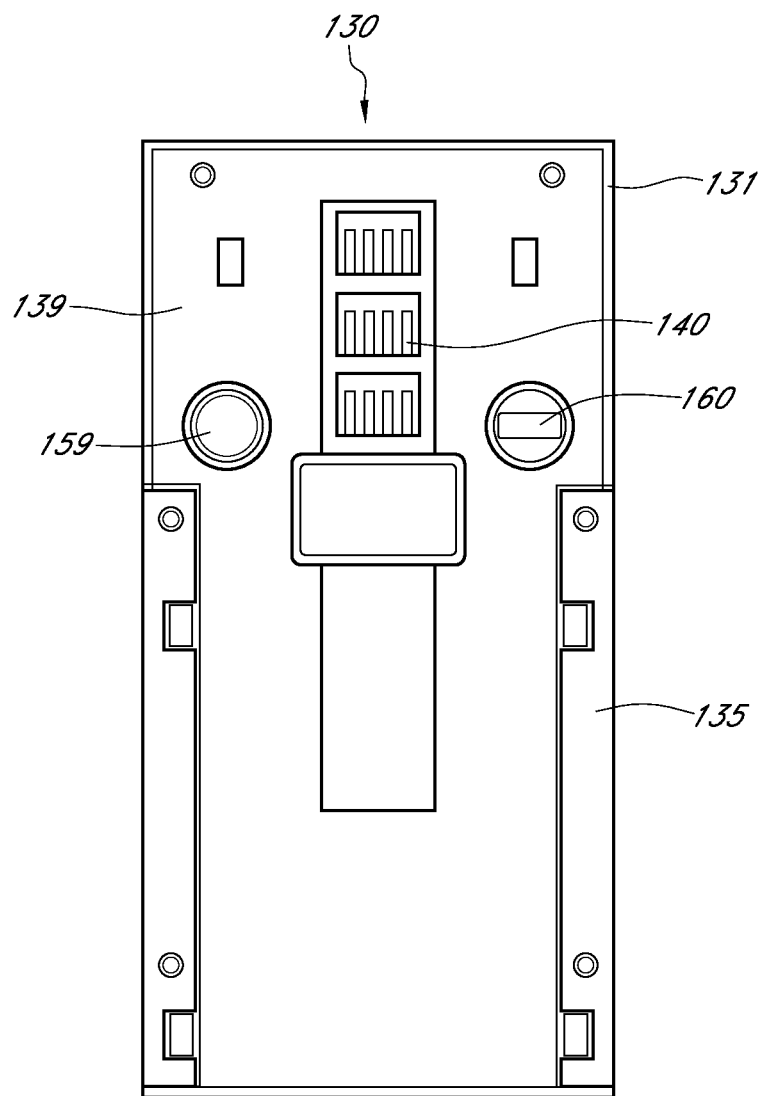
FIG. 4 is a rear view of the A/V recording and communication device of FIG. 3.
Figure 5:
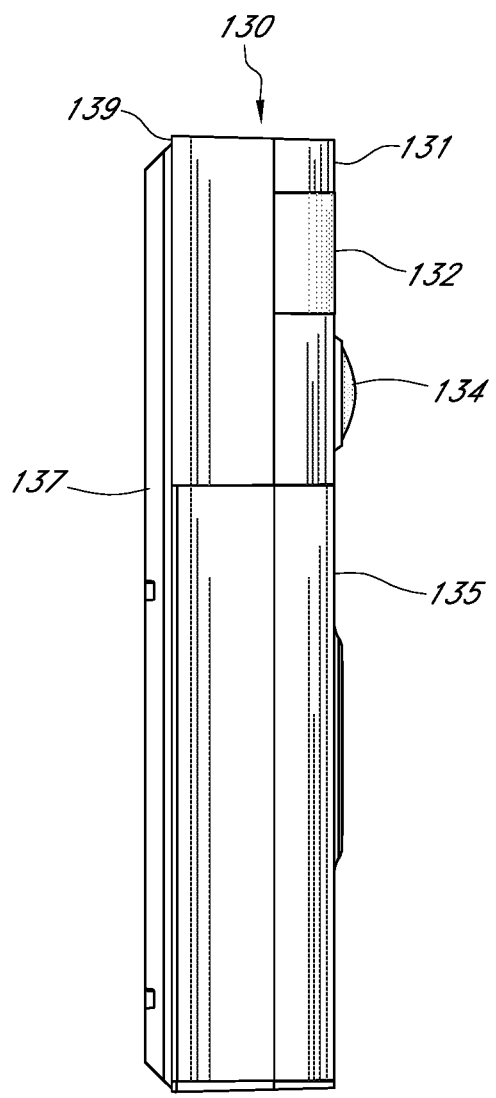
FIG. 5 is a left side view of the A/V recording and communication device of FIG. 3 attached to a mounting bracket according to various aspects of the present disclosure.

FIGS. 3-5 illustrate an audio/video (A/V) communication doorbell 130 according to an aspect of present embodiments. FIG. 3 is a front view, FIG. 4 is a rear view, and FIG. 5 is a left side view of the doorbell 130 coupled with a mounting bracket 137. The doorbell 130 includes a faceplate 135 mounted to a back plate 139 (FIG. 4). With reference to FIG. 5, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 3 and 5, the doorbell 130 further includes an enclosure 131 that engages the faceplate 135. In the illustrated embodiment, the enclosure 131 abuts an upper edge 135T (FIG. 3) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 5, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 6:
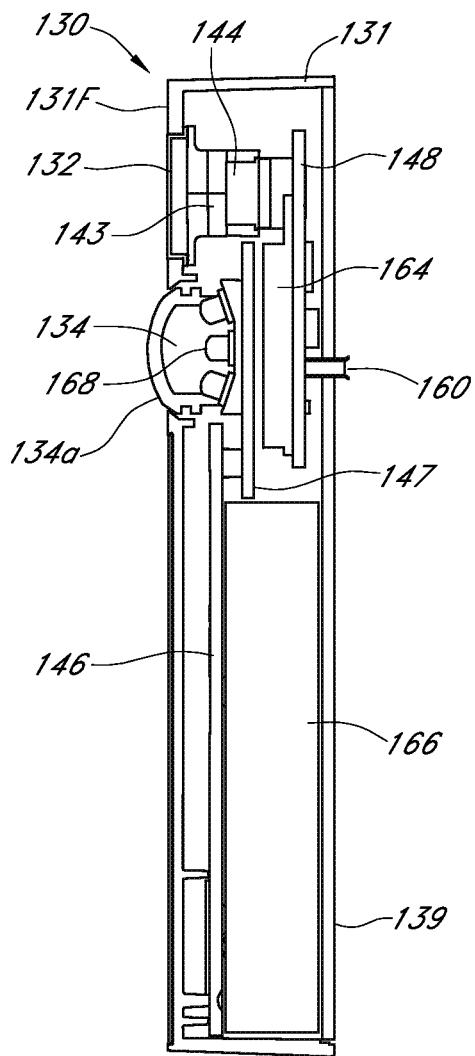
FIG. 6 is right-side cross-sectional view of the A/V recording and communication device of FIG. 3.

FIG. 6 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 6, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions.

With continued reference to FIG. 6, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 6, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 7:
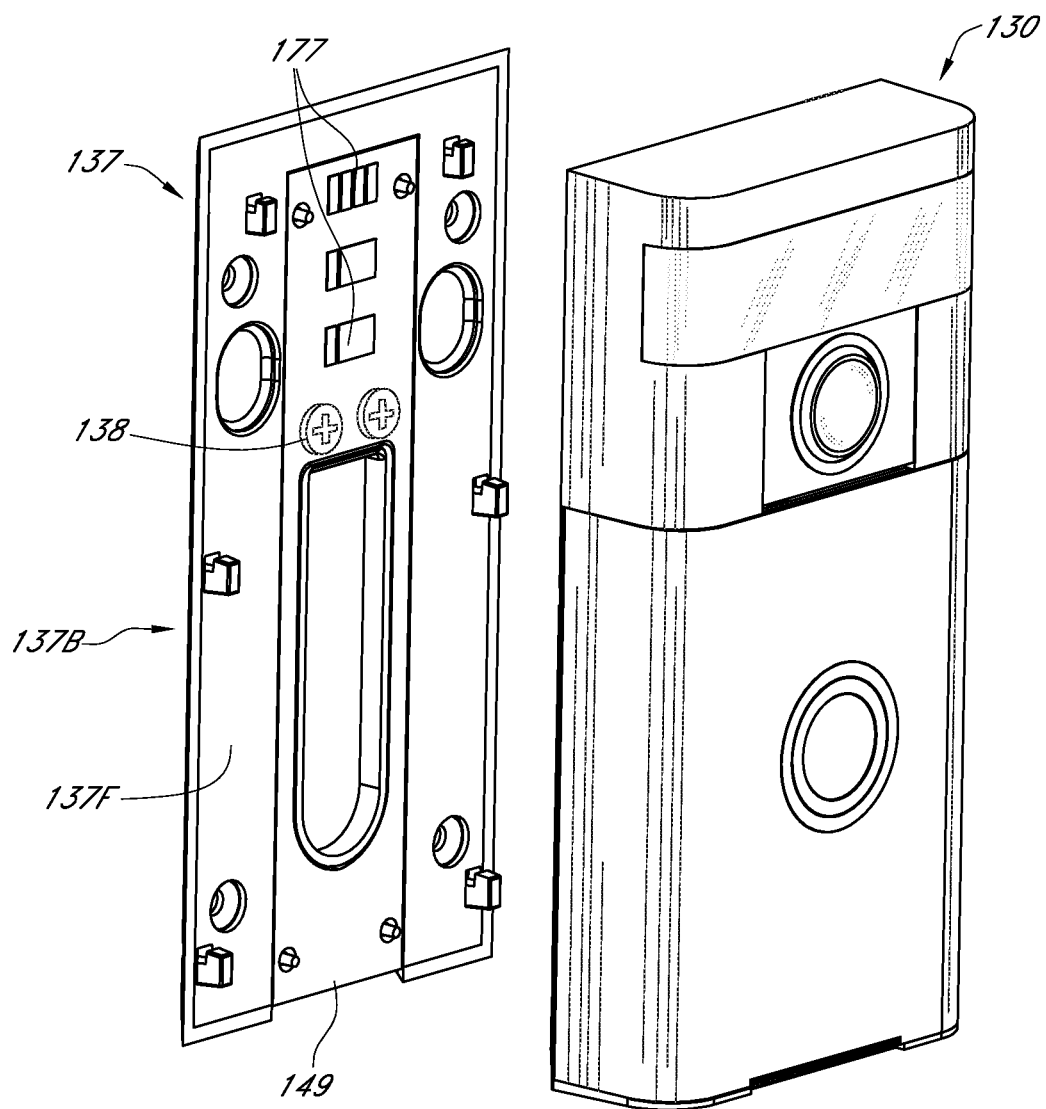
FIG. 7 is an exploded view of the A/V recording and communication device and the mounting bracket of FIG. 5.

FIG. 7 is an exploded view of the doorbell 130 and the mounting bracket 137 according to an aspect of the present embodiments. The mounting bracket 137 is configured to be mounted to a mounting surface (not shown) of a structure, such as a home or an office. FIG. 7 shows the front side 137F of the mounting bracket 137. The mounting bracket 137 is configured to be mounted to the mounting surface such that the back side 137B thereof faces the mounting surface. In certain embodiments, the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 7, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 8:
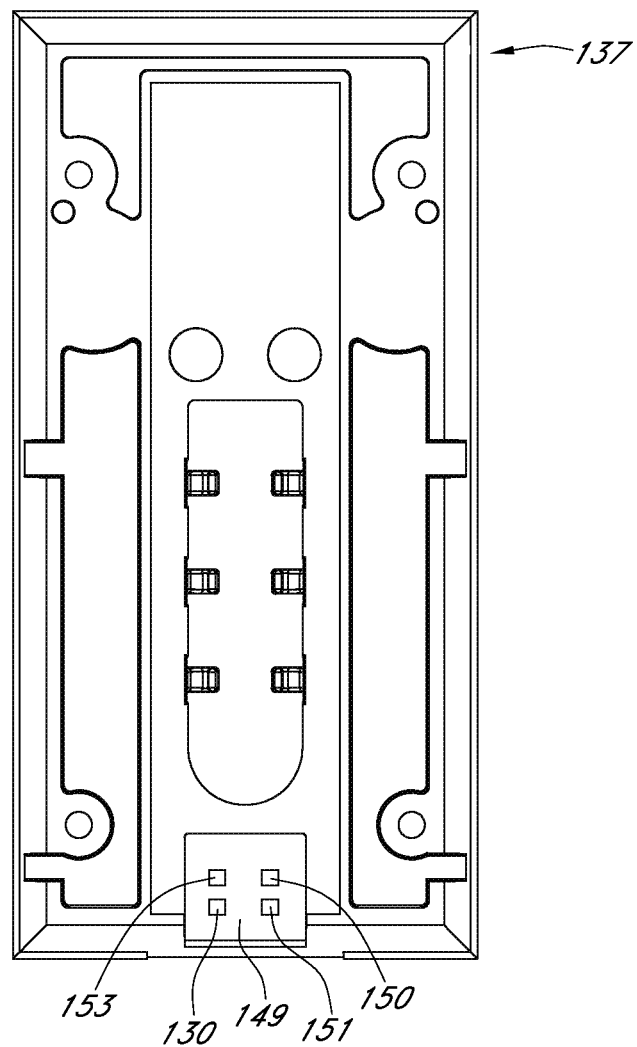
FIG. 8 is a rear view of the mounting bracket of FIG. 5.

With reference to FIGS. 7 and 8 (which is a rear view of the mounting bracket 137), the mounting bracket 137 further comprises a bracket PCB 149. With reference to FIG. 8, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 9:
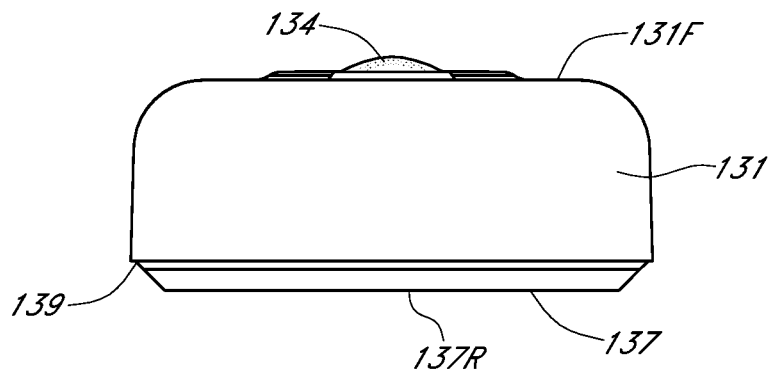
FIGS. 9 and 10 are top and bottom views, respectively, of the A/V recording and communication device and the mounting bracket of FIG. 5.
Figure 10:
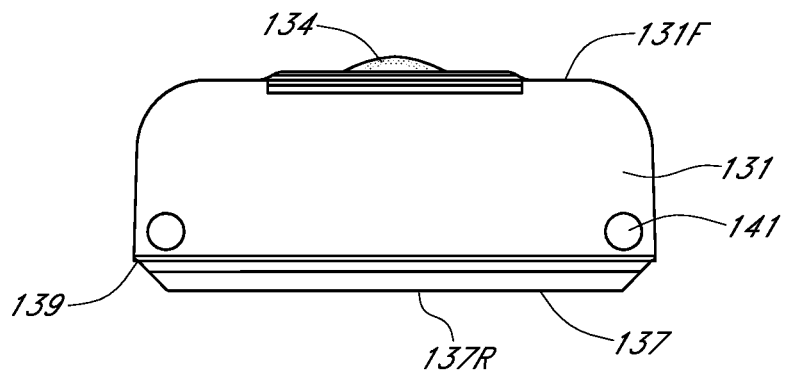

FIGS. 9 and 10 are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 10, the lower end of the enclosure 131 may include security screw apertures 141 configured to receive screws or other fasteners.

Figure 11:
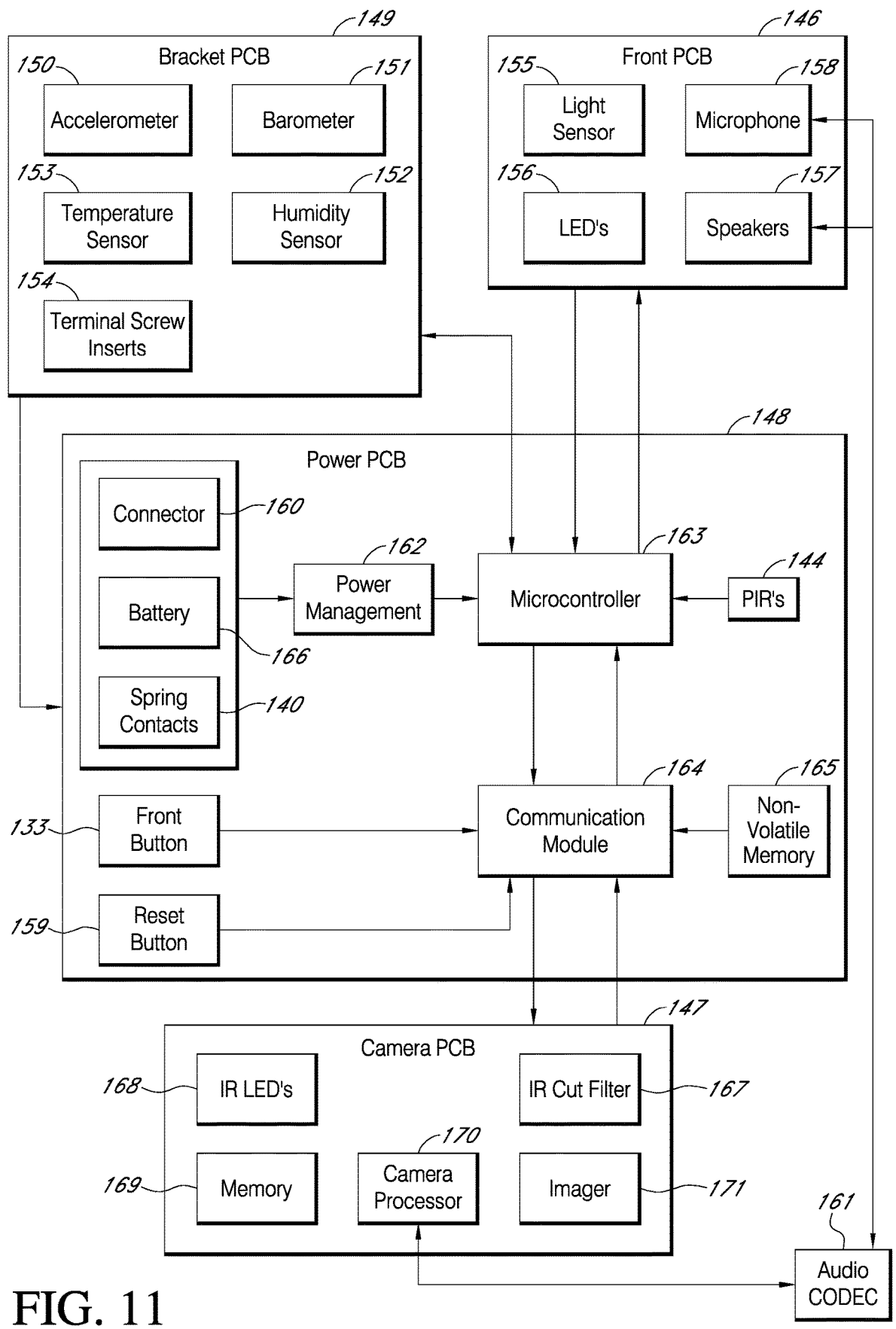
FIG. 11 a functional block diagram of the components of the A/V recording and communication device of FIG. 3.

FIG. 11 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 11, the bracket PCB 149 may further comprise terminal screw inserts 154, which may be configured to receive the terminal screws 138 and transmit power to the electrical contacts 177 on the mounting bracket 137 (FIG. 7). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 11, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electromechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 11, the power PCB 148 may comprise a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 11, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 11, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 11, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 1080p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

As described above, the present embodiments leverage the capabilities of audio/video (A/V) recording and communication devices, thereby providing enhanced functionality to such devices to reduce crime and increase public safety. One aspect of the present embodiments includes a user of an A/V recording and communication device viewing video footage recorded by the A/V recording and communication device. When the user believes that the video footage may contain evidence of the commission of a crime (or crimes), the user may report (e.g. transmit) the video footage to a reward provider. The reward provider reviews the reported video footage and determines whether the video footage indicates that a crime may have been committed. When it is determined, based on the reported video footage, that a crime may have been committed, the reward provider posts an offer of a reward for information about the crime.

The present embodiments are well suited for use in combination with one or more processes for sharing video footage from A/V recording and communication devices. For example, the present embodiments may be combined with one or more processes for sharing video footage with other users of A/V recording and communication devices, with one or more processes for sharing video footage from A/V recording and communication devices via social media, and/or with one or more processes for sharing video footage from A/V recording and communication devices with law enforcement. Examples of processes for sharing video footage with other users of A/V recording and communication devices, for sharing video footage from A/V recording and communication devices via social media, and for sharing video footage from A/V recording and communication devices with law enforcement are described in U.S. Patent Application Ser. No. 62/300,547, filed on Feb. 26, 2016, and U.S. patent application Ser. Nos. 15/431,275 and 15/431,607, filed on Feb. 13, 2017; U.S. Patent Application Ser. No. 62/270,373, filed on Dec. 21, 2015, and U.S. patent application Ser. Nos. 15/387,444 and 15/387,471, filed on Dec. 21, 2016; U.S. patent application Ser. No. 62/271,186, filed on Dec. 22, 2015; and U.S. patent application Ser. No. 62/288,971, filed on Jan. 29, 2016, all of which are incorporated herein by reference in their entireties as if fully set forth.

Figure 12:
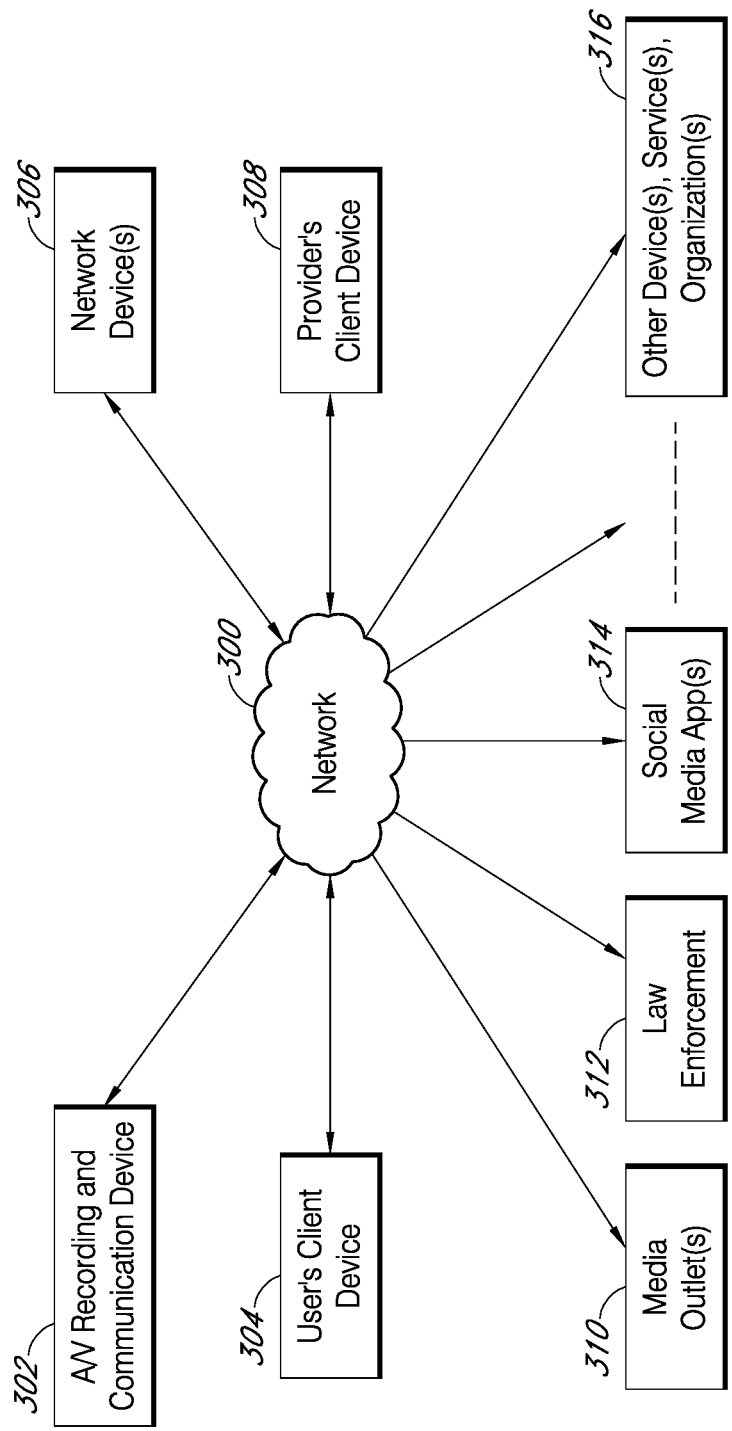
FIG. 12 is a functional block diagram illustrating a network of interconnected devices that are leveraged according to the present embodiments to identify criminal perpetrators, reduce crime, and enhance public safety.

FIG. 12 is a functional block diagram illustrating a network 300 of interconnected devices that may be leveraged according to the present embodiments to identify and apprehend criminal perpetrators, reduce crime, and enhance public safety. The network 300 includes an A/V recording and communication device 302, a user's client device 304, a network device(s) 306, and a provider's client device 308. The A/V recording and communication device 302 may be similar to, or the same as, the A/V recording and communication device 100 described above with reference to FIG. 1, and/or the A/V recording and communication device 130 described above with reference to FIGS. 3-11. Alternatively, the A/V recording and communication device 302 may not be a doorbell, and may be, for example, an A/V recording and communication security camera. The user's client device 304 may be similar to, or the same as, the user's client device 114 described above with reference to FIG. 1, and/or the client device 800 described below with reference to FIG. 18. The network device(s) 306 may include devices similar to, or the same as, the storage 116, the server 118, and/or the backend API 120 described above with reference to FIG. 1. The provider's client device 308 may be a device that is similar to, or the same as, the user's client device 114 described above with reference to FIG. 1, and/or the client device 800 described below with reference to FIG. 18. The A/V recording and communication device 302, the user's client device 304, the backend API, and the provider's client device 308 are all connected to the network 300, which may be similar to, or the same as, the network 112 described above with reference to FIG. 1.

The network 300 is further connected to a plurality of other devices, services, and/or organizations. For example, in the illustrated embodiment, the network 300 is connected to at least one media outlet 310, at least one law enforcement agency 312, at least one social media application 314, and one or more other device(s), service(s), and/or organization(s) 316. In one aspect of the present embodiments, when a user reports video footage to a reward provider, and the reward provider reviews the reported video footage and determines that a crime may have been committed, the reward provider posts an offer of a reward for information about the crime by transmitting information about the reward offer to the at least one media outlet 310, and/or the at least one law enforcement agency 312, and/or the at least one social media application 314, and/or the one or more other device(s), service(s), and/or organization(s) 316, as further described below.

Figure 13:
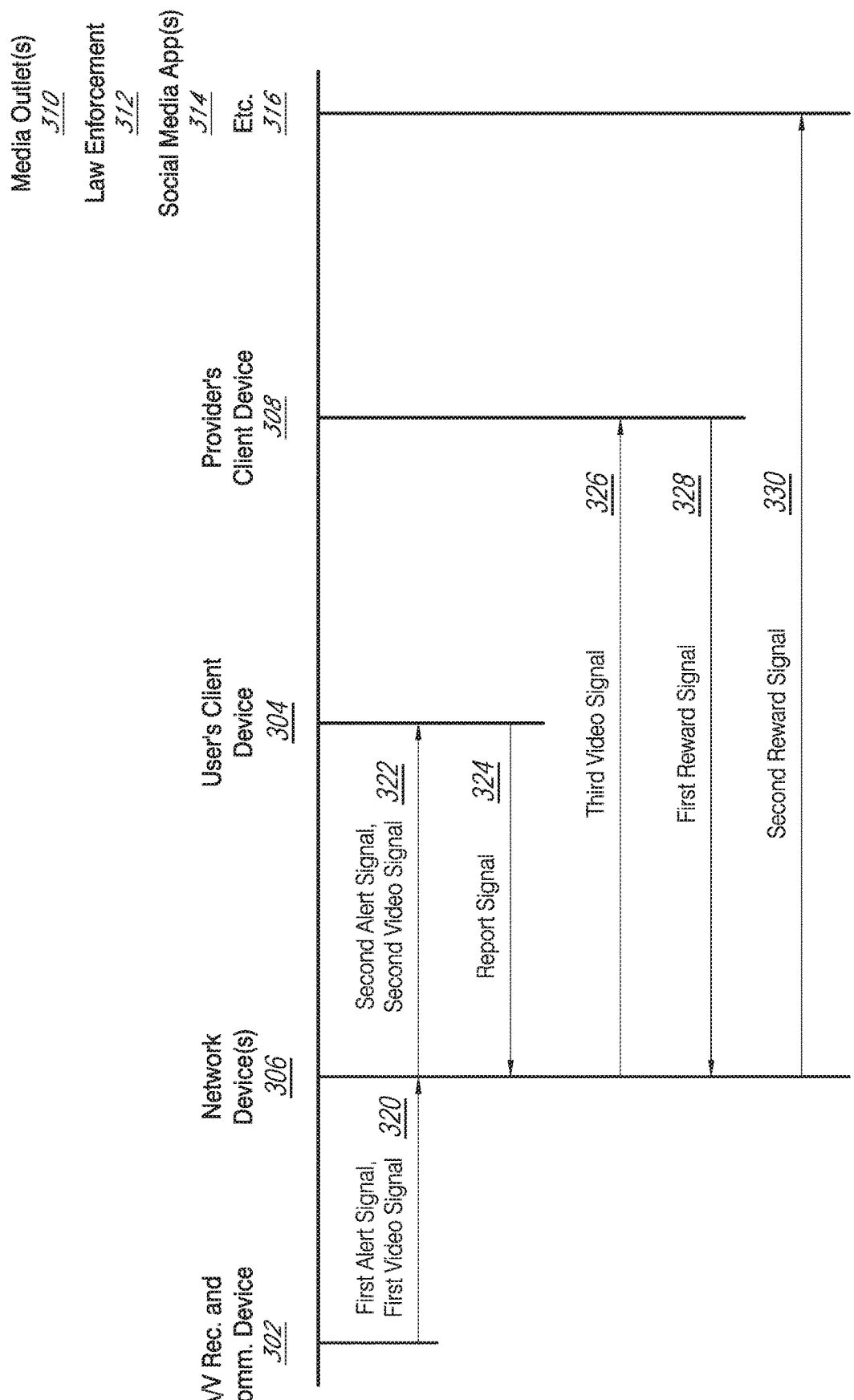
FIG. 13 is a sequence diagram illustrating an embodiment of a process for leveraging the capabilities of A/V recording and communication devices according to various aspects of the present disclosure.

FIG. 13 is a sequence diagram illustrating an embodiment of a process for leveraging the capabilities of A/V recording and communication devices according to various aspects of the present disclosure. An A/V recording and communication device 302 may record video footage, which may also include audio. For example, the A/V recording and communication device 302 may begin recording the video footage when a visitor is detected at the A/V recording and communication device 302, which may occur, for example, when the A/V recording and communication device 302 detects motion or when the visitor presses the front button on the A/V recording and communication device 302 (if the A/V recording and communication device 302 is a doorbell). (In this context, the term "visitor" is used broadly to encompass any person who is or was within the field of view of the camera of the A/V recording and communication device 302, and who may be depicted on video footage captured by the camera.)

With further reference to FIG. 13, the A/V recording and communication device 302 sends a first alert signal and a first video signal 320 to one or more network devices 306 in the network 300, and the one or more network devices 306 receive the first alert signal and the first video signal 320. The network 300 includes one or more network devices 306, such as, for example, one or more storage devices (such as, for example, the storage device 116), one or more servers (such as, for example, the server 118), one or more APIs (such as, for example, the backend API 120), one or more routers, one or more switches, etc. At least some of the network devices 306 include a processor and a memory. The first video signal 320 includes images (the video footage) captured by a camera of the A/V recording and communication device 302.

The network device(s) 306 transmits to the user's client device 304, in response to receiving the first alert signal and the first video signal 320, a second alert signal and a second video signal 322. The second alert signal 322 may be, for example, a push notification. A push notification, also called a server push notification, is the delivery of information from a software application to a computing device without a specific request from the client. The second video signal 322 may include the images captured by the camera of the A/V recording and communication device 302. The user associated with the user's client device 304 may be the owner/user of the A/V recording and communication device 302. The user, upon receiving the second alert signal 322, may choose to answer the second alert signal 322, which may, for example, open a live call between the user and the visitor at the A/V recording and communication device 302. Alternatively, the user may ignore the second alert signal 322 (e.g. choose not to answer the call). If the user ignores the second alert signal 322, he or she may still view the video footage of the second video signal 322 at a later time.

After viewing (or while viewing) the video footage on the display of his or her client device 304, the user may report the video footage to a reward provider. For example, the user may select a "report" button from within an application executing on his or her client device 304, as described in detail below with reference to FIGS. 16 and 17. The user may choose to report the video footage if, for example, he or she believes that the video footage contains evidence of the commission of a crime (or crimes). The user's client device 304 then sends a report signal 324 to the network device(s) 306, and the network device(s) 306 receives the report signal 324 from the user's client device 304. In alternative embodiments, the report signal 324 may be sent from the user's client device 304 to one or more other devices in the network 300, rather than to the same network device(s) 306 that sent the second alert signal and the second video signal 322 to the user's client device 304.

In addition to reporting the video footage to a reward provider, the user may also share the video footage with other users of A/V recording and communication devices, with one or more social media applications, and/or with law enforcement. Examples of processes for sharing video footage with other users of A/V recording and communication devices, with one or more social media applications, and with law enforcement are described below and also in U.S. patent application Ser. No. 62/300,547, filed on Feb. 26, 2016, and U.S. patent application Ser. Nos. 15/431,275 and 15/431,607, filed on Feb. 13, 2017; U.S. Patent Application Ser. No. 62/270,373, filed on Dec. 21, 2015, and U.S. patent application Ser. Nos. 15/387,444 and 15/387,471, filed on Dec. 21, 2016; U.S. patent application Ser. No. 62/271,186, filed on Dec. 22, 2015; and U.S. patent application Ser. No. 62/288,971, filed on Jan. 29, 2016, all of which are incorporated herein by reference in their entireties as if fully set forth.

In response to receiving the report signal 324 from the user's client device 304, a reward provider reviews the video footage and determines whether the video footage indicates that a crime (or crimes) has been committed. In one example embodiment, the review of the video footage and/or the determination of whether the video footage indicates that a crime (or crimes) has been committed is/are conducted by a person (or persons) associated with the reward provider. Thus, for example, the person(s) (may also be referred to as the reviewer(s)) may view the video footage at (or on) the provider's client device 308 (FIG. 12). The provider's client device 308 may be a computing device such as a personal computer (may also be referred to as a desktop computer), a portable computer (may also be referred to as a laptop computer, a notebook computer, or a tablet computer), a smartphone, a PDA (personal digital assistant), etc. In some embodiments, the provider's client device 308 may be a device that is similar to, or the same as, the user's client device 114 described above with reference to FIG. 1 and/or the client device 800 described below with reference to FIG. 18.

With further reference to FIG. 13, when the reviewer views the video footage at the provider's client device 308, the network device(s) 306 transmits the video footage to the provider's client device 308 in a third video signal 326. When viewing (or after viewing) the video footage, the reviewer determines whether the video footage indicates that a crime (or crimes) may have been committed. When it is determined that a crime may have been committed, the reward provider posts an offer of a reward for information about the crime. Thus, for example, a first reward signal 328 may be sent from the provider's client device 308 to the network device(s) 306. The first reward signal 328 may include information about the reward to be offered such as, for example, an amount of the reward (or other identifying information about the reward if the reward is not monetary). The first reward signal 328 may also include other information, such as information about the crime(s) that may have been committed, such as, for example, a location where the video footage was recorded. The first reward signal 328 may also include at least a portion of the video footage that the user reported to the reward provider. The at least a portion of the video footage may comprise a still image of the alleged perpetrator(s), such as a still image of the alleged perpetrator(s) face(s), which may be useful to members of the public in helping to identify the alleged perpetrator(s). In alternative embodiments, the first reward signal 328 may be sent from the provider's client device 308 to one or more other devices in the network 300, rather than to the same network device(s) 306 that sent the third video signal 326 to the provider's client device 308.

In some embodiments, the review of the video footage and/or the determination of whether the video footage indicates that a crime (or crimes) has been committed may be automated, e.g. performed by one or more devices and/or software applications rather than by one or more persons. For example, the process of reviewing the video footage may comprise facial recognition technology (and/or any other type of biometric identification, such as fingerprint, palm veins, DNA, palm print, hand geometry, iris, retina, odor/scent, gait, and voice). Using facial recognition technology, video images of a person's face captured by the camera of the A/V recording and communication device 302 may be compared with information in a database. The information in the database may include information about one or more persons, such as facial characteristics and/or other personally identifying information. Based on the comparison of the video images of a person's face captured by the camera of the A/V recording and communication device 302 with the information in the database, it may be determined whether the person recorded by the camera of the A/V recording and communication device 302 matches a person in the database. If a match is found, the present embodiments may further comprise forwarding information about the match to law enforcement and/or transmitting a reward signal to the network device 306.

With further reference to FIG. 13, in response to receiving the first reward signal 328, the network device(s) 306 may transmit a second reward signal 330 to the at least one media outlet 310, and/or the at least one law enforcement agency 312, and/or the at least one social media application 314, and/or the one or more other device(s), service(s), and/or organization(s) 316, as described above with reference to FIG. 12, and as further described below.

In some example embodiments, posting the reward offer may comprise the reward provider transmitting information about the reward and/or the crime(s) and/or the alleged perpetrator(s) to the at least one media outlet 310. The at least one media outlet 310 may comprise, for example, a local news organization, and/or a regional news organization, and/or a national news organization, and/or an international news organization. The news organization(s) may include broadcast media, print media, and/or electronic/online media. Transmitting information to the at least one media outlet 310 may comprise, for example, transmitting the information via e-mail, via a web portal, and/or via one or more backend devices, such as a server and/or an API.

In other example embodiments, posting the reward offer may comprise the reward provider transmitting information about the reward and/or the crime(s) and/or the alleged perpetrator(s) to the at least one social media application 314. The at least one social media application 314 may comprise, for example, a publicly accessible social network such as Facebook or Twitter, and/or a private or semi-private social network such as Nextdoor, and/or a social network that is only available to users of A/V recording and communication devices. Transmitting information to the at least one social media application 314 may comprise, for example, transmitting the information via a web portal and/or via one or more backend devices, such as a server and/or an API.

In other example embodiments, posting the reward offer may comprise the reward provider transmitting information about the reward and/or the crime(s) and/or the alleged perpetrator(s) to the at least one law enforcement agency 312. The at least one law enforcement agency 312 may comprise, for example, a local police department, and/or a federal agency such as the FBI (Federal Bureau of Investigation). Transmitting information to the at least one law enforcement agency 312 may comprise, for example, transmitting the information via e-mail, via a web portal, and/or via one or more backend devices, such as a server and/or an API.

In other example embodiments, posting the reward offer may comprise the reward provider placing one or more advertisements, such as online advertisements and/or targeted advertisements. For example, the reward provider may place a targeted advertisement with a social network, such as Facebook. The targeted advertisement may be configured to appear in the news feeds of users who meet one or more criteria, such as being located in a geographic area close to the location where the reported video footage was recorded. The targeted advertisement may include a link to the reported video footage, enabling the user who sees the targeted advertisement in his or her news feed to easily view the reported video footage. The targeted advertisement (or another screen/window shown to the user after he or she selects the link to the reported video footage) may further include a link to a screen/window/page where the user can submit information about the reported video footage.

In other example embodiments, posting the reward offer may comprise the reward provider posting a notice on the reward provider's website (and/or on another party's website). For example, the reward provider may provide a website(s) with link(s) to one or more videos, where the videos include video footage reported to the reward provider in connection with suspected crimes. Visitors to the website may view the posted videos and submit information that may be helpful in identifying the persons depicted in the videos and/or in solving the crimes depicted. For example, a visitor to the website may be able to select a link associated with a video and enter information about the video on a webpage (or in a popup window, etc.) accessed by selecting the link. The posted videos may include information that aids visitors to the website in locating videos for which they may be able to provide helpful information. For example, each posted video may indicate where it was recorded, such as the city and state, the neighborhood, the street address, the nearest major intersection, etc. In some embodiments, the posted videos on the website may be organized by location to further aid visitors to the website in locating videos for which they may be able to provide helpful information. In some embodiments, the posted videos on the web site may include one or more links enabling visitors to the web site to share the posted videos on social media. For example, if a visitor to the website selects a link associated with a posted video, that video may be posted to the visitor's social media account(s).

One aspect of posting the reward offer may comprise determining an amount of the reward, where the reward is monetary, and/or determining a description of the reward, where the reward is non-monetary. For example, in some embodiments the amount of the reward may be based on, and/or directly correlated with, the number of other A/V recording and communication devices that are within a defined distance of the A/V recording and communication device 302 that recorded the reported video footage. In such embodiments, higher rewards may be offered for suspected crimes that happen in areas having higher densities of A/V recording and communication devices. Also in such embodiments, information about a plurality of A/V recording and communication devices may be stored in one or more data structures accessible to the reward provider. For example, the information may include the location of each device (such as the street address or GPS (Global Positioning System) coordinates of each device). The reward provider may access the information in the data structure(s) to determine the number of other A/V recording and communication devices that are within the defined distance of the A/V recording and communication device 302 that recorded the reported video footage.

Also in some embodiments, the amount of the reward may be based on the severity of the suspected crime. For example, greater rewards may be offered for more severe crimes and lesser rewards may be offered for less severe crimes. Also in some embodiments, the amount of the reward may be based on the demographics of the area/neighborhood in which the suspected crime occurred. For example, higher rewards may be offered for suspected crimes that happen in wealthier areas.

After the reward offer has been posted, another aspect of the present embodiments may comprise receiving information about the suspected crime associated with the reward offer, such as receiving information about one or more possible perpetrators. For example, the received information may comprise information about the identity (or identities) of one or more persons depicted in the reported video footage, which person(s) may have committed the suspected crime. In the present embodiments, the information may be received by one or more persons and/or agencies and/or organizations, etc. For example, the information may be received by the reward provider, who may then pass the information along to a law enforcement agency 312. In another example, the information may be received by a law enforcement agency 312. The law enforcement agency 312 receiving the information may later share the information (or share the fact that information was provided) with the reward provider, so that the reward provider can pay the reward to the party that provided the information to the law enforcement agency 312. In the present embodiments, the information may be received in any way, such as, for example, and without limitation, via a web portal, via e-mail, via telephone, or in person.

After the information about the suspected crime associated with the reward offer has been received, another aspect of the present embodiments may comprise paying the reward. In some embodiments, a person who provides information may be eligible for the reward if the information provided leads to the arrest and/or conviction of one or more perpetrators of the crime. In other embodiments, a person who provides information may be eligible for the reward if the information provided leads to a positive identification of one or more perpetrators of the crime, even if the perpetrator(s) is never arrested and/or convicted.

In some embodiments, the reward provider may verify the identity of one or more persons who provide information and/or verify the value of the information provided (e.g. whether the information provided led to the positive identification, arrest, and/or conviction of one or more perpetrators of the crime) before paying the reward. For example, the reward provider may request and/or receive verification of one or more such details from law enforcement and/or from public sources, such as media providers, before paying the reward.

In addition to, or instead of, posting the offer of a reward for information about the suspected crime, the reward provider may share at least a portion of the video footage and/or information about the suspected crime with one or more other users of A/V recording and communication devices. Sharing the video footage and/or the information about the suspected crime with one or more other users of A/V recording and communication devices may comprise, for example, transmitting the video footage and/or the information via e-mail, and/or via a web portal, and/or via one or more network devices, such as the storage device 116, the server 118, and/or the backend API 120. Determining one or more other users of A/V recording and communication devices with whom to share the video footage and/or the information about the suspected crime may comprise the reward provider receiving information identifying a source of the video footage. For example, the report signal 324 (FIG. 13) sent from the user's client device 304 to the at least one network device(s) 306 may include an identifier that ties the video footage to the user and/or to the user's A/V recording and communication device 302. The reward provider may then access at least one data structure to determine, based on the identifier, which of one or more other users of A/V recording and communication devices with whom to share the video footage and/or the information about the suspected crime, and the reward provider may then transmit the video footage and/or the information about the suspected crime to the one or more determined other users of A/V recording and communication devices. For example, the determination may be based on a distance between the A/V recording and communication device 302 that recorded the shared video footage and the one or more other A/V recording and communication devices. The locations of the A/V recording and communication devices may be stored in at least one data structure, and the at least one data structure may be stored at one or more network devices accessible to the reward provider, such as, for example, the storage device 116, the server 118, and/or the backend API 120. When the reward provider reviews the video footage reported by the user, determines that a crime may have been committed, and transmits the first reward signal 328 to the at least one network device(s) 306, the first reward signal 328 (or a separate signal sent at the same time as, or at substantially the same time as, the first reward signal 328) may include a command to access the at least one data structure, determine the one or more other users of A/V recording and communication devices with whom to share the video footage, and transmit the video footage and/or the information about the suspected crime to the one or more determined other users. The video footage and/or the information about the suspected crime may then be transmitted to the one or more determined other users, for example in the second reward signal 330 (or in a separate signal sent at the same time as, or at substantially the same time as, the second reward signal 330).

In addition to, or instead of, posting the offer of a reward for information about the suspected crime, the reward provider may transmit at least a portion of the video footage and/or information about the suspected crime to at least one law enforcement agency 312. Transmitting the video footage and/or the information about the suspected crime to the at least one law enforcement agency 312 may comprise, for example, transmitting the video footage and/or the information via e-mail, and/or via a web portal, and/or via one or more network devices, such as the storage device 116, the server 118, and/or the backend API 120.

In addition to, or instead of, posting the offer of a reward for information about the suspected crime, the reward provider may transmit at least a portion of the video footage and/or information about the suspected crime to at least one social media application 314. Transmitting the video footage and/or the information about the suspected crime to the at least one social media application 314 may comprise, for example, transmitting the video footage and/or the information via e-mail, and/or via a web portal, and/or via one or more network devices, such as the storage device 116, the server 118, and/or the backend API 120. Determining one or more social media applications 314 to which to transmit the video footage and/or the information about the suspected crime may comprise the reward provider receiving information identifying a source of the video footage. For example, the report signal 324 (FIG. 13) sent from the user's client device 304 to the at least one network device(s) 306 may include an identifier that ties the video footage to the user and/or to the user's A/V recording and communication device 302. The reward provider may then access at least one data structure to determine, based on the identifier, which of one or more social media applications 314 is to receive the video footage and/or the information about the suspected crime, and the reward provider may then transmit the video footage and/or the information about the suspected crime to the one or more determined social media applications 314. For example, the user of the A/V recording and communication device 302 may pre-designate one or more social media applications 314 to receive shared video footage, and this information may be stored in the at least one data structure. The at least one data structure may be stored at one or more network devices accessible to the reward provider, such as, for example, the storage device 116, the server 118, and/or the backend API 120. When the reward provider reviews the video footage reported by the user, determines that a crime may have been committed, and transmits the first reward signal 328 to the at least one network device(s) 306, the first reward signal 328 (or a separate signal sent at the same time as, or at substantially the same time as, the first reward signal 328) may include a command to access the at least one data structure, determine the one or more social media applications 314 to receive shared video footage, and transmit the video footage and/or the information about the suspected crime to the one or more determined social media applications 314. The video footage and/or the information about the suspected crime may then be transmitted to the one or more determined social media applications 314, for example in the second reward signal 330 (or in a separate signal sent at the same time as, or at substantially the same time as, the second reward signal 330).

The process described above with reference to FIGS. 12 and 13 advantageously enables users of A/V recording and communication devices to report video footage to a reward provider. The reward provider may then review the reported video footage, determine whether a crime may have been committed, determine an amount of a reward to be offered, and post a reward offer through one or more outlets. These features can help reduce crime by publicizing criminal events and incentivizing members of the public to come forward with information that can be used to help identify and apprehend criminal perpetrators and/or solve crimes.

As discussed above, in addition to reporting the video footage to a reward provider, the user may also share the video footage with other users of A/V recording and communication devices, with one or more social media applications, and/or with law enforcement. Further example embodiments of processes for sharing video footage with other users of A/V recording and communication devices, with one or more social media applications, and with law enforcement are described below and also in U.S. Patent Application Ser. No. 62/300,547, filed on Feb. 26, 2016, and U.S. patent application Ser. Nos. 15/431,275 and 15/431,607, filed on Feb. 13, 2017; U.S. Patent Application Ser. No. 62/270,373, filed on Dec. 21, 2015, and U.S. patent application Ser. Nos. 15/387,444 and 15/387,471, filed on Dec. 21, 2016; U.S. patent application Ser. No. 62/271,186, filed on Dec. 22, 2015; and U.S. patent application Ser. No. 62/288,971, filed on Jan. 29, 2016, all of which are incorporated herein by reference in their entireties as if fully set forth.

Figure 14:
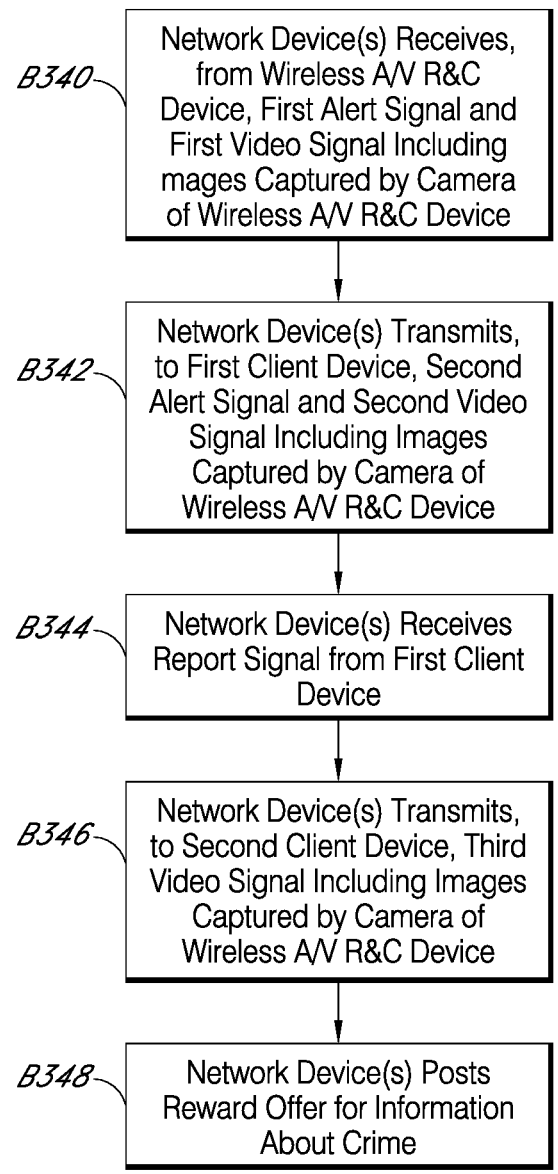
FIG. 14 is a flowchart illustrating a process for leveraging the capabilities of A/V recording and communication devices according to various aspects of the present disclosure.

FIG. 14 is a flowchart illustrating a process for leveraging the capabilities of A/V recording and communication devices according to various aspects of the present disclosure. At block B340, a network device 306 receives, from an A/V recording and communication device 302, a first alert signal and a first video signal 320. The first video signal 320 includes images captured by a camera of the A/V recording and communication device 302. At block B342, the network device 306 transmits, to a first client device 304, in response to receiving the first alert signal and the first video signal 320, a second alert signal and a second video signal 322. The second video signal 322 includes the images captured by the camera of the A/V recording and communication device 302. At block B344, the network device 306 receives a report signal 324 from the first client device 304. At block B346, in response to receiving the report signal 324 from the first client device 304, the network device 306 transmits, to a second client device 304, a third video signal 326. The third video signal 326 includes the images captured by the camera of the A/V recording and communication device 302. At block B348, when it is determined, based on the images captured by the camera of the A/V recording and communication device 302, that a crime may have been committed, the network device 306 posts an offer of a reward for information about the crime.

Figure 15:
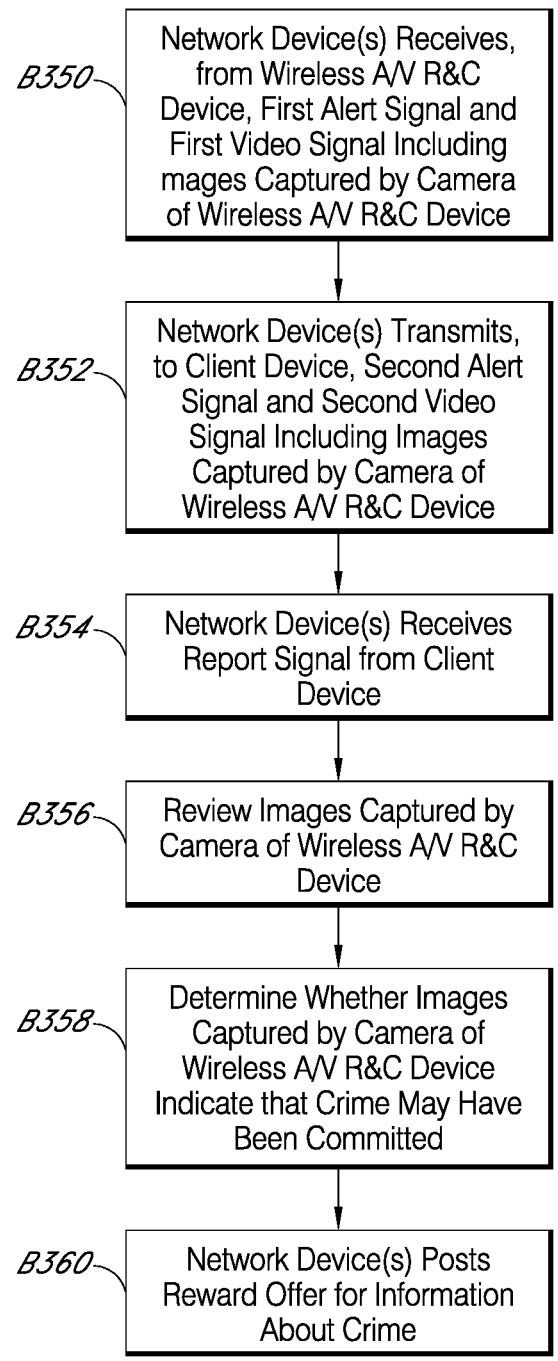
FIG. 15 is a flowchart illustrating another process for leveraging the capabilities of A/V recording and communication devices according to various aspects of the present disclosure.

FIG. 15 is a flowchart illustrating another process for leveraging the capabilities of A/V recording and communication devices according to various aspects of the present disclosure. At block B350, a network device 306 receives, from an A/V recording and communication device 302, a first alert signal and a first video signal 320. The first video signal 320 includes images captured by a camera of the A/V recording and communication device 302. At block B352, the network device 306 transmits, to a client device 304, in response to receiving the first alert signal and the first video signal 320, a second alert signal and a second video signal 322. The second video signal 322 includes the images captured by the camera of the A/V recording and communication device 302. At block B354, the network device 306 receives a report signal 324 from the client device 304. At block B356, in response to receiving the report signal 324 from the client device 304, the images captured by the camera of the A/V recording and communication device 302 are reviewed. At block B358, it is determined whether the images captured by the camera of the A/V recording and communication device 302 indicate that a crime may have been committed. At block B360, when it is determined, based on the images captured by the camera of the A/V recording and communication device 302, that a crime may have been committed, the network device 306 posts an offer of a reward for information about the crime.

Figure 16:
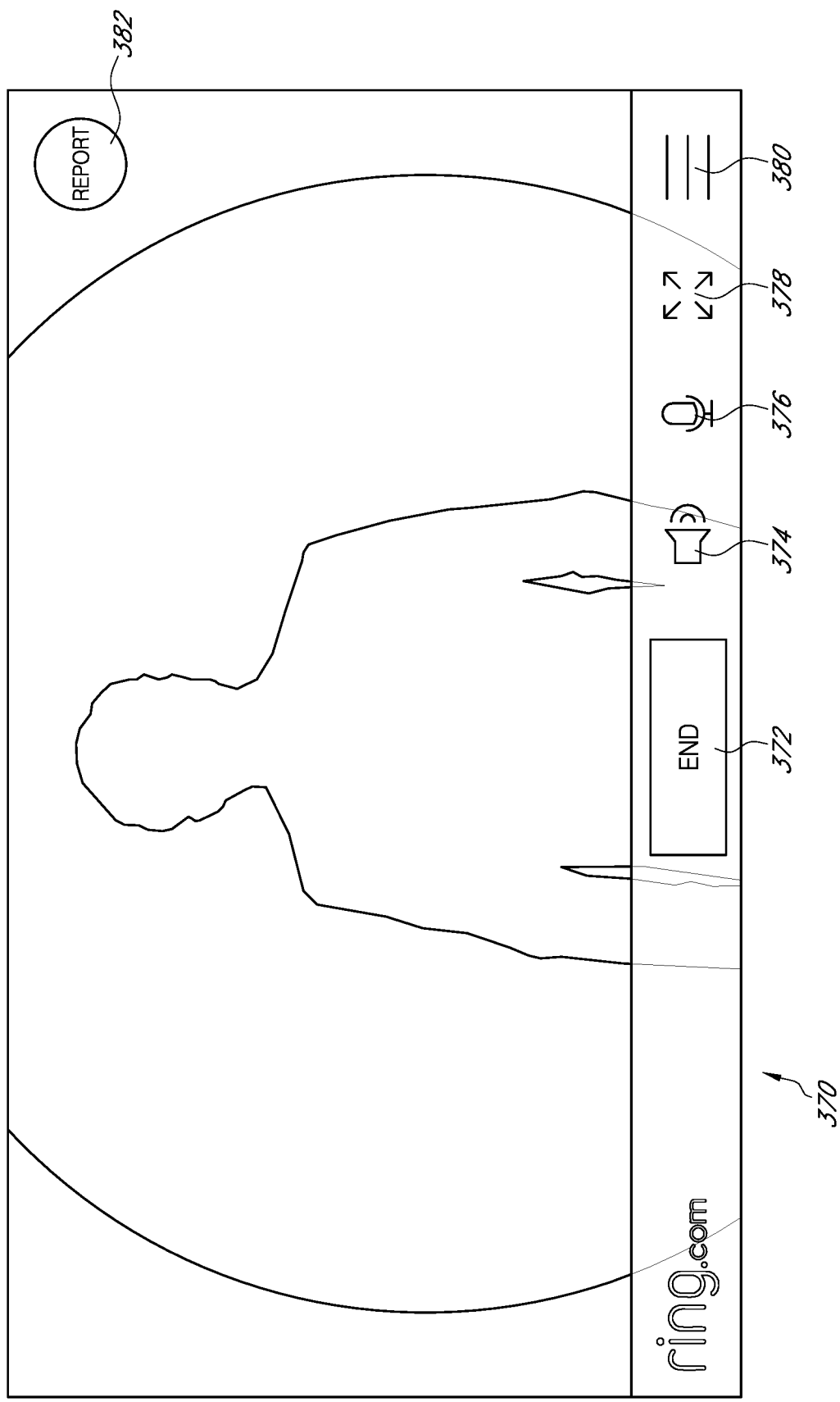
FIG. 16 is a screenshot of a graphical user interface (GUI) illustrating aspects of a process for reporting a possible crime including video footage from an A/V recording and communication device according to an aspect of the present disclosure.

FIG. 16 is a screenshot of a graphical user interface (GUI) 370 illustrating aspects of a process for reporting a possible crime including video footage from an A/V recording and communication device 302 according to an aspect of the present disclosure. The process of FIG. 16 is described from the perspective of a user who receives an alert signal and a video signal on his or her client device 304 using an application executing on the user's client device 304. Thus, the GUI 370 illustrated in FIG. 16 is configured to be displayed on a display of the user's client device 304, such as a smartphone.

With reference to FIG. 16, a live call screen is illustrated. When a user's A/V recording and communication device 302 detects motion, or, in the case of a doorbell, when a visitor presses the front button on the doorbell, the user receives an alert on his or her client device 304 along with streaming video footage recorded by the camera of the A/V recording and communication device 302. If the user answers the alert, a live call screen such as that shown in FIG. 16 may be displayed on the display of the user's client device 304. The live call screen may include one or more buttons, such as an END button 372 (to terminate or disconnect the call), a volume adjust button 374, a mute button 376, a full screen button 378 (to expand the video so that it fills the entire display screen), and/or a menu button 380.

With further reference to FIG. 16, the live call screen may further include a report button 382. If the user selects the report button 382 during the live call, the GUI 370 may display a notification (not shown) that the user will be prompted after the live call to report the video of the call. The user may choose to report the video of the call if, for example, he or she believes that the video contains evidence of the commission of a crime (or crimes). If the user selects the report button 382 during the live call, then after the call is terminated, such as when the user selects the END button 372 on the live call screen, one or more report screens (not shown) may be shown on the GUI 370. The report screen(s) may guide the user through the process of reporting the video of the call.

As described above, in some embodiments the user may share the video footage with other users of A/V recording and communication devices, and/or may share the video footage via social media, and/or may share the video footage with law enforcement. In such embodiments, the GUI 370 of FIG. 16 may include a share button (not shown) in addition to the report button 382. If the user selects the share button during the live call, the GUI 370 may display a notification (not shown) that the user will be prompted after the live call to share the video of the call. In other example embodiments, the GUI 370 may not include separate report and share buttons, but may instead combine the features of these aspects into a single button. Thus, for example, if the user selects the combined report/share button during the live call, the GUI 370 may display a notification (not shown) that the user will be prompted after the live call to report and/or share the video of the call. After the live call ends, the GUI 370 may display a screen or popup window with one or more options for reporting and/or sharing the video of the call. For example, the user may select one or more of the options from this screen or popup window and the application then executes each of the user-selected options. In one example embodiment, the user may select to report the video of the call to the reward provider and to share the video of the call with other users of A/V recording and communication devices. In another example embodiment, the user may select to report the video of the call to the reward provider and to share the video footage via social media. In another example embodiment, the user may select to report the video of the call to the reward provider and to share the video footage with law enforcement. In another example embodiment, the user may select to report the video of the call to the reward provider and to share the video footage with two or more of: Other users of A/V recording and communication devices; social media; and law enforcement.

In some embodiments, shared videos may be accessed by law enforcement agencies. For example, a user sharing a video may have the option to make the shared video available to law enforcement through a web portal. Law enforcement may be able to log in through the web portal to view the shared videos. For example, the web portal may include a map view (not shown) indicating the locations of all of the shared videos. The map view may include selectable markers or icons (not shown) corresponding to the locations of the shared videos. Selecting one of the icons may open a video player and begin playback of the shared video corresponding to the selected icon. Different law enforcement agencies, departments, or groups may have different logins that grant access to specific zones, such as geographic locations that are within the jurisdiction of each agency, department, or group.

Figure 17:
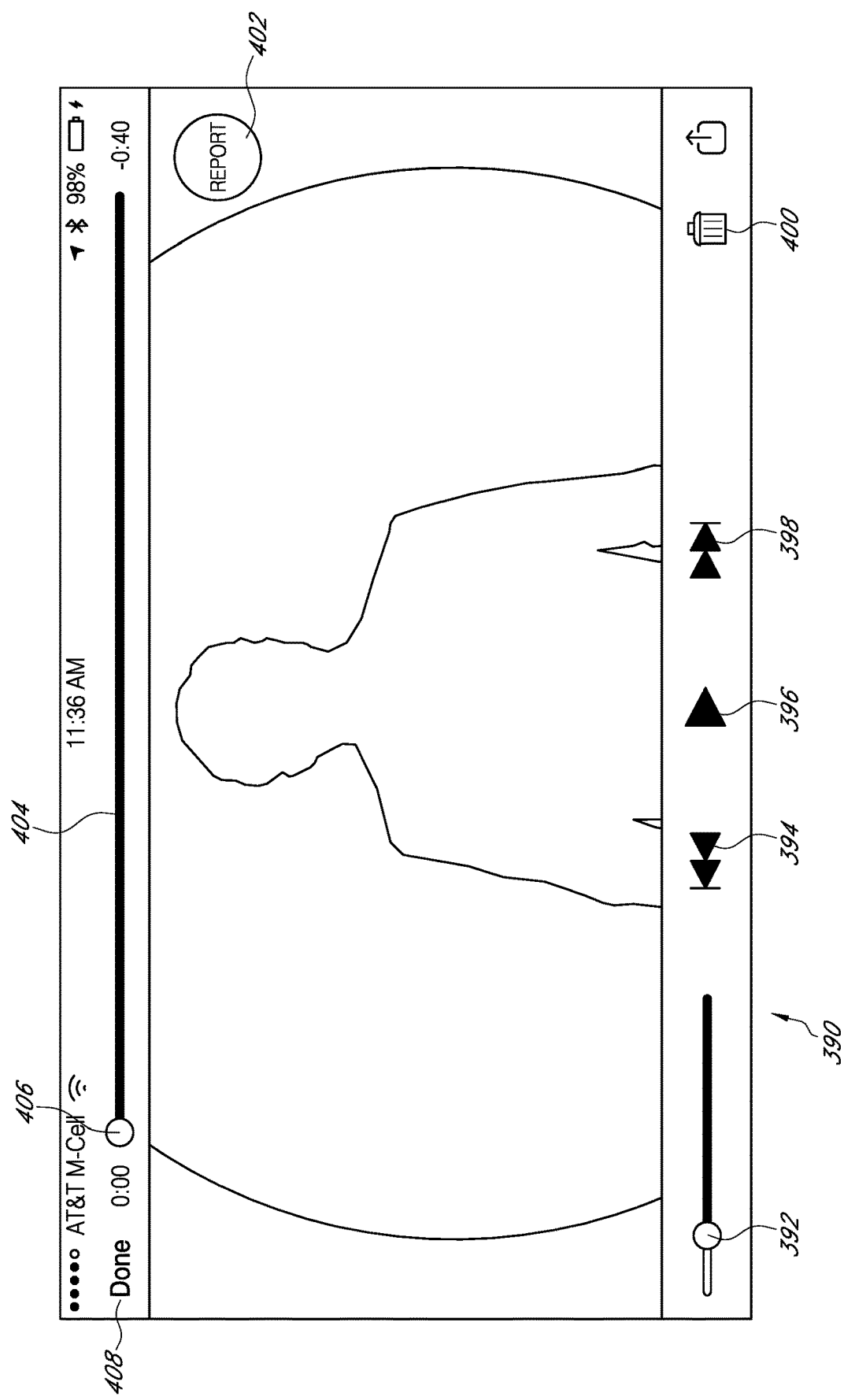
FIG. 17 is a screenshot of a graphical user interface (GUI) illustrating aspects of another process for reporting a possible crime including video footage from an A/V recording and communication device according to an aspect of the present disclosure.

FIG. 17 is a screenshot of a graphical user interface (GUI) 390 illustrating aspects of another process for reporting a possible crime including video footage from an A/V recording and communication device 302 according to an aspect of the present disclosure. The process of FIG. 17 is described from the perspective of a user who views an earlier-recorded video on his or her client device 304 using an application executing on the user's client device 304. Thus, the GUI 390 illustrated in FIG. 17 is configured to be displayed on a display of the user's client device 304, such as a smartphone. In this embodiment, the video displayed on the user's client device 304 is not a live call, but rather is a recording of an event that took place earlier in time. The recording may be, however, a recording of an earlier live call between the user and a visitor. (In this context, the term "visitor" is used broadly to encompass any person who is or was within the field of view of the camera of the A/V recording and communication device 302, and who may be depicted on video footage captured by the camera.)

With reference to FIG. 17, a video playback screen is illustrated. When a user's A/V recording and communication device 302 detects motion, or, in the case of a doorbell, when a visitor presses the front button on the doorbell, the user receives an alert on his or her client device 304 along with streaming video footage recorded by the camera of the A/V recording and communication device 302. If the user ignores the alert, the motion event or button press event may nevertheless be recorded and stored at a remote network device 306. When the user later accesses the stored video footage, the video may be displayed on the video playback screen on the user's client device 304, as shown in FIG. 17. Alternatively, if the user answers the alert and communicates with the visitor, the user may still view the recorded video footage at a later time.

With further reference to FIG. 17, the video playback screen may include one or more buttons or controls, such as a volume adjustment slider widget 392, a rewind button 394, a play button 396, a fast forward button 398, a delete button 400, and/or a report button 402. If the user selects the report button 402, one or more report screens (not shown) may be shown on the GUI 390. The report screen(s) may guide the user through the process of reporting the video footage. The user may choose to report the video footage if, for example, he or she believes that the video contains evidence of the commission of a crime (or crimes).

With further reference to FIG. 17, the video playback screen may further include a progress bar 404 and a slider widget 406 that indicates what portion of the video is currently playing. For example, a timer at a first end of the progress bar 404 indicates how much of the video has elapsed, and a timer at a second end of the progress bar 404 indicates how much of the video is left to play. As the video plays, the progress slider widget 406 moves from the first end to the second end of the progress bar 404. If the user wants to jump to a particular portion of the video, he or she may move the slider widget 406 left or right by selecting it, sliding it along the progress bar 404, and releasing it. The video playback screen may further include a Done button 408, which, when selected, closes the video and returns the user to a previous screen within the application executing on the user's client device 304.

As described above, in some embodiments the user may share the video footage with other users of A/V recording and communication devices, and/or may share the video footage via social media, and/or may share the video footage with law enforcement. In such embodiments, the GUI 390 of FIG. 17 may include a share button (not shown) in addition to the report button 402. If the user selects the share button, one or more share screens (not shown) may be shown on the GUI 390. The share screen(s) may guide the user through the process of sharing the video footage. In other example embodiments, the GUI 390 may not include separate report and share buttons, but may instead combine the features of these aspects into a single button. Thus, for example, if the user selects the combined report/share button, one or more report/share screens (not shown) may be shown on the GUI 390. The report/share screen(s) may guide the user through the process(es) of reporting and/or sharing the video footage. For example, the GUI 390 may display a screen or popup window with one or more options for reporting and/or sharing the video footage. For example, the user may select one or more of the options from this screen or popup window and the application then executes each of the user-selected options. In one example embodiment, the user may select to report the video footage to the reward provider and to share the video footage with other users of A/V recording and communication devices. In another example embodiment, the user may select to report the video footage to the reward provider and to share the video footage via social media. In another example embodiment, the user may select to report the video footage to the reward provider and to share the video footage with law enforcement. In another example embodiment, the user may select to report the video footage to the reward provider and to share the video footage with two or more of: Other users of A/V recording and communication devices; social media; and law enforcement.

In some embodiments, shared videos may be accessed by law enforcement agencies. For example, a user sharing a video may have the option to make the shared video available to law enforcement through a web portal. Law enforcement may be able to log in through the web portal to view the shared videos. For example, the web portal may include a map view (not shown) indicating the locations of all of the shared videos. The map view may include selectable markers or icons (not shown) corresponding to the locations of the shared videos. Selecting one of the icons may open a video player and begin playback of the shared video corresponding to the selected icon. Different law enforcement agencies, departments, or groups may have different logins that grant access to specific zones, such as geographic locations that are within the jurisdiction of each agency, department, or group.

In some embodiments, video footage recorded by a user's A/V recording and communication device 302 may not be stored at a remote network device 306 on a long-term basis. In such embodiments, the user may still report video footage from his or her A/V recording and communication device 302 to the reward provider, but only from a live call, such as according to the process described above with reference to FIG. 16 (and not from a video playback process, such as that described above with reference to FIG. 17). To enable this aspect, all video recorded by the user's A/V recording and communication device 302 may be temporarily stored at a remote network device 306 so that it is available for reporting to the reward provider if the user reports the video footage from the live call. For example, the video may be temporarily stored at a remote network device 306 as long as the live call is in progress, but if the live call terminates without the user selecting the report button 382 (FIG. 16), the video that was temporarily stored at the remote network device 306 may then be deleted.

As described above, the present embodiments advantageously enable users of A/V recording and communication devices to report video footage to a reward provider. The reward provider may then review the reported video footage, determine whether a crime may have been committed, determine an amount of a reward to be offered, and post a reward offer through one or more outlets. These features can help reduce crime by publicizing criminal events and incentivizing members of the public to come forward with information that can be used to help identify and apprehend criminal perpetrators and/or solve crimes.

Figure 18:
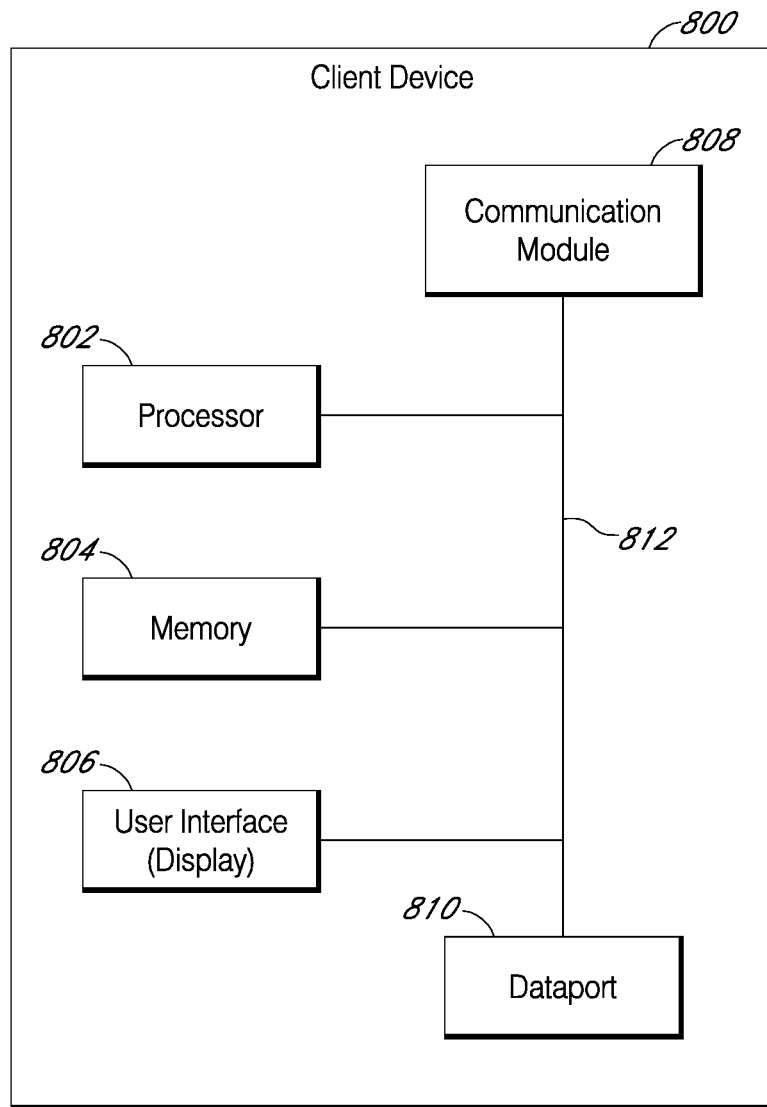
FIG. 18 is a functional block diagram of a client device on which the present embodiments may be implemented according to various aspects of the present disclosure.

FIG. 18 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 18, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 19:
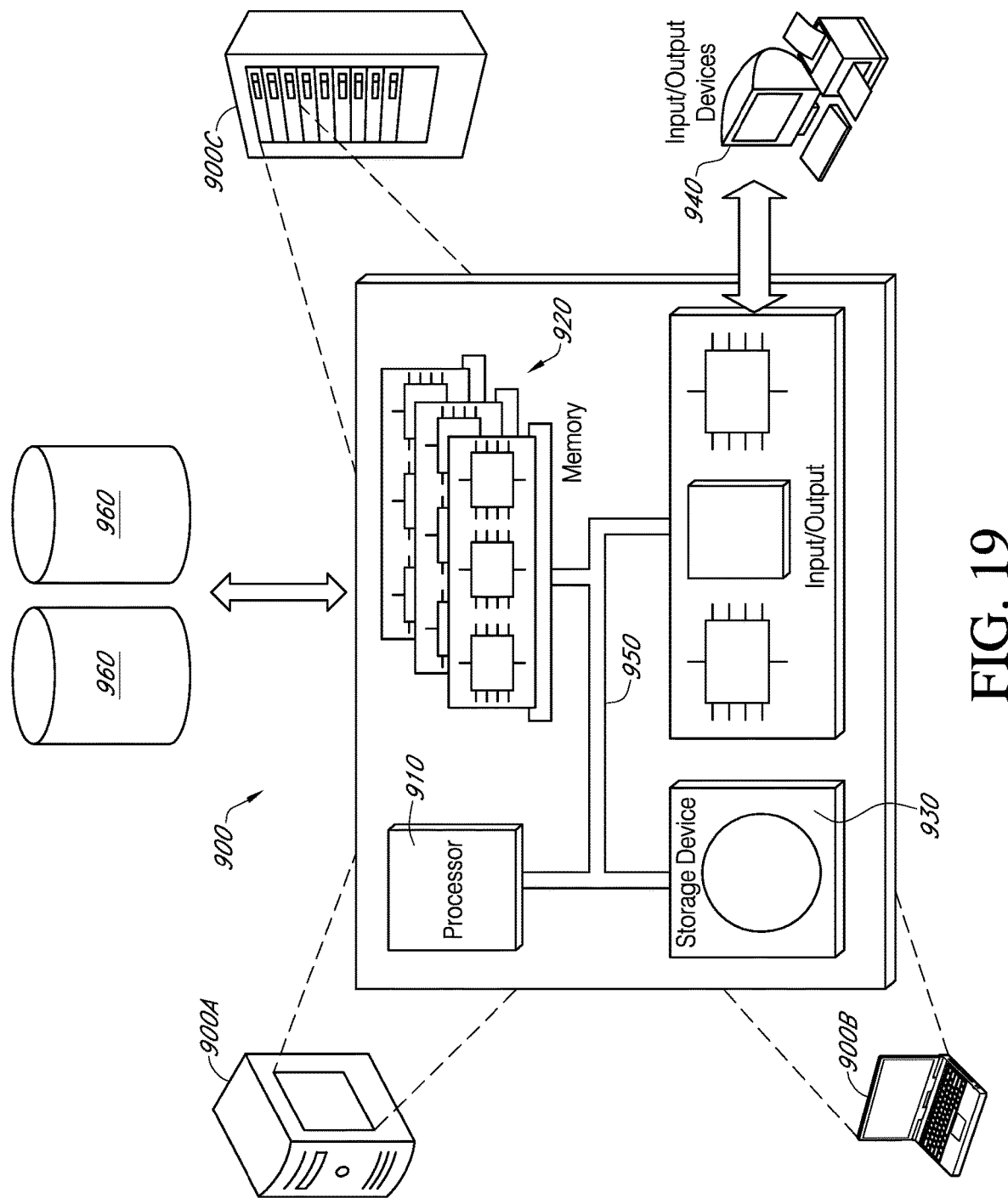
FIG. 19 is a functional block diagram of a general-purpose computing system on which the present embodiments may be implemented according to various aspects of present disclosure.

FIG. 19 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
   receiving, from an audio/video recording and communication device (A/V device), a first alert signal and a first video signal, the first video signal including images captured by a camera of the A/V device;
   transmitting, to a first client device associated with the A/V device, in response to receiving the first alert signal and the first video signal, a second alert signal and a second video signal, the second video signal including the images;
   receiving a report signal, from the first client device, indicating that the images should be analyzed for a crime being committed, wherein the report signal includes an identifier associated with the A/V device;
   analyzing, in response to receiving the report signal from the first client device, the images to determine whether the images indicate that the crime has been committed;
   determining, based on the images that the crime has been committed; and
   determining the at least one other user with whom to share the images based on a relationship of the at least one other user with the identifier associated with the A/V device;
   transmitting, to at least a second client device associated with the at least one other user, a reward signal including at least a portion of the images and an offer of a reward for information about the crime.

2. The method of claim 1, wherein transmitting the offer of the reward comprises transmitting information about the reward to at least one media outlet.

3. The method of claim 1, wherein transmitting the offer of the reward comprises buying one or more advertisements.

4. The method of claim 3, wherein the advertisements are online advertisements.

5. The method of claim 1, further comprising, when it is determined, based on the images captured by the camera of the A/V device, that the crime has been committed, transmitting the images to a law enforcement agency.

6. The method of claim 1, further comprising:
   identifying a source of the received images captured by the camera of the A/V device based on the identifier associated with the A/V device;
   in response to receiving the report signal from the first client device, accessing at least one data structure to determine, based on the identifier associated with the A/V device, at least one social media service to receive the images captured by the camera of the A/V device; and
   sending the images captured by the camera of the A/V device to the at least one determined social media service.

7. The method of claim 1, wherein:
the A/V device is a first A/V device associated with a first user;
determining the at least one other user with whom to share the images based on the relationship with the identifier of the A/V device comprises identifying a set of other A/V devices, associated with the at least one other user, that is within a defined distance of the first A/V device; and
the method further comprising determining an amount of the reward based on a number of devices identified in the set other A/V devices.

8. The method of claim 1, wherein the information about the crime comprises information about a person who committed the crime.

9. The method of claim 1, further comprising:
receiving the information about the crime; and
paying the reward.

10. The method of claim 1, wherein the A/V device is an A/V doorbell.

11. The method of claim 1, wherein the first client device is a smartphone.

12. The method of claim 1, wherein determining that the crime has been committed is performed using facial recognition.

13. A non-transitory machine-readable medium storing a program, the program executable by a processing unit of a device, the program comprising sets of instructions for:
receiving, from an audio/video recording and communication device (A/V device), a first alert signal and a first video signal, the first video signal including images captured by a camera of the A/V device;
transmitting, to a first client device associated with the A/V device, in response to receiving the first alert signal and the first video signal, a second alert signal and a second video signal, the second video signal including the images;
receiving a report signal, from the first client device, indicating that the images should be analyzed for a crime being committed, wherein the report signal includes an identifier associated with the A/V device;
analyzing, in response to receiving the report signal from the first client device, the images to determine whether the images indicate that the crime has been committed;
determining, based on the images, that the crime has been committed;
determining the at least one other user with whom to share the images based on a relationship of the at least one other user with the identifier associated with the A/V device;
transmitting, to at least a second client device, a third video signal including at least a portion of the images captured by the camera of the A/V device; and
transmitting, to the at least second client device associated with the at least one other user, the images and an offer of a reward for information about the crime.

14. The non-transitory machine-readable medium of claim 13, wherein the set of instructions for transmitting the offer of the reward further comprises a set of instructions for transmitting information about the reward to at least one media outlet.

15. The non-transitory machine-readable medium of claim 13, wherein the set of instructions for transmitting the offer of the reward further comprises a set of instructions for buying one or more advertisements.

16. The non-transitory machine-readable medium of claim 13, wherein the program further comprises a set of instructions for, in response to receiving the report signal from the first client device, transmitting the images captured by the camera of the A/V device to a law enforcement agency.

17. The non-transitory machine-readable medium of claim 13, wherein the program further comprises sets of instructions for:
identifying a source of the received images captured by the camera of the A/V device based on the identifier associated with the A/V device;
in response to receiving the report signal from the first client device, accessing at least one data structure to determine, based on the identifier associated with the A/V device, at least one social media service to receive the images captured by the camera of the A/V device; and
sending the images captured by the camera of the A/V device to the at least one determined social media service.

18. The non-transitory machine-readable medium of claim 13, wherein the A/V device is a first A/V device associated with a first user:
determining the at least one other user with whom to share the images based on the relationship with the identifier of the A/V device comprises identifying a set of other A/V devices, associated with the at least one other user, that is within a defined distance of the first A/V device; and
the program further comprising sets of instructions for determining an amount of the reward based on a number of devices identified in the set other A/V devices.

19. The non-transitory machine-readable medium of claim 13, wherein the program further comprises sets of instructions for:
receiving the information about the crime; and
providing the reward.

20. The non-transitory machine-readable medium of claim 13, wherein determining that the crime has been committed is performed using facial recognition.

* * * * *